US009559813B2

United States Patent
Yang et al.

(10) Patent No.: US 9,559,813 B2
(45) Date of Patent: Jan. 31, 2017

(54) METHOD FOR TRANSMITTING CONTROL INFORMATION AND APPARATUS FOR SAME

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/163,424

(22) Filed: May 24, 2016

(65) Prior Publication Data

US 2016/0269152 A1    Sep. 15, 2016

Related U.S. Application Data

(63) Continuation of application No. 14/238,652, filed as application No. PCT/KR2012/007676 on Sep. 24, 2012, now Pat. No. 9,374,808.

(Continued)

(30) Foreign Application Priority Data

Sep. 24, 2012 (KR) .................. 10-2012-0106159

(51) Int. Cl.
*H04L 1/18* (2006.01)
*H04W 72/04* (2009.01)

(52) U.S. Cl.
CPC ........ *H04L 1/1861* (2013.01); *H04W 72/0413* (2013.01)

(58) Field of Classification Search
None
See application file for complete search history.

(56) References Cited

U.S. PATENT DOCUMENTS

2009/0129317 A1*   5/2009 Che .................. H04L 1/1614
                                                           370/328
2009/0245421 A1   10/2009 Montojo et al.
(Continued)

FOREIGN PATENT DOCUMENTS

CN           101978635 A    2/2011
KR   10-2010-0099665 A    9/2010
(Continued)

OTHER PUBLICATIONS

LG Electronics, "TDD UL ACK/NACK mode 1 enhancements," 3GPP TSG RAN WG1 Meeting #66, Aug. 22-26, 2011, 4 pages, R1-112328.

(Continued)

*Primary Examiner* — Jenee Williams
(74) *Attorney, Agent, or Firm* — Birch, Stewart, Kolasch & Birch, LLP

(57) ABSTRACT

A method and a user equipment for transmitting uplink control information in a wireless communication system supporting carrier aggregation and operating in time division duplex (TDD) are discussed, the user equipment being configured with a first component carrier (CC) and a second CC having different uplink-downlink configurations, the user equipment being configured to transmit a hybrid automatic repeat request-acknowledgement (HARQ-ACK) response based on channel selection. The method according to an embodiment includes determining and transmitting HARQ-ACK bits. When a value W is 1 or 2, one or more HARQ-ACK bits for the first CC are determined based on min (M1, W) and one or more HARQ-ACK bits for the second CC are determined based on min (M2, W). Min (A, B) represents a smallest number, M1 represents a number of downlink subframes, and M2 represents a number of downlink subframes.

14 Claims, 18 Drawing Sheets

Related U.S. Application Data

(60) Provisional application No. 61/696,313, filed on Sep. 4, 2012, provisional application No. 61/678,592, filed on Aug. 1, 2012, provisional application No. 61/671,103, filed on Jul. 13, 2012, provisional application No. 61/658,424, filed on Jun. 12, 2012, provisional application No. 61/620,996, filed on Apr. 6, 2012, provisional application No. 61/586,825, filed on Jan. 15, 2012, provisional application No. 61/544,254, filed on Oct. 6, 2011, provisional application No. 61/538,142, filed on Sep. 23, 2011.

(56) References Cited

U.S. PATENT DOCUMENTS

| | | | |
|---|---|---|---|
| 2010/0080139 A1 | 4/2010 | Palanki et al. | |
| 2011/0228863 A1* | 9/2011 | Papasakellariou | H04L 1/0031 375/259 |
| 2011/0235619 A1* | 9/2011 | Chong | H04L 1/0041 370/335 |
| 2011/0243039 A1* | 10/2011 | Papasakellariou | H04L 1/1861 370/280 |
| 2011/0268090 A1* | 11/2011 | Qu | H03M 13/136 370/335 |
| 2012/0034927 A1* | 2/2012 | Papasakellariou | H04L 1/1861 455/450 |
| 2012/0039285 A1 | 2/2012 | Seo et al. | |
| 2012/0051245 A1* | 3/2012 | Nam | H04L 1/1671 370/252 |
| 2012/0106569 A1* | 5/2012 | Che | H04L 1/1671 370/437 |
| 2012/0134306 A1* | 5/2012 | Cheng | H04L 1/0042 370/281 |
| 2012/0300722 A1 | 11/2012 | Kim et al. | |
| 2013/0034029 A1* | 2/2013 | Lee | H04L 1/1861 370/280 |
| 2013/0034073 A1* | 2/2013 | Aiba | H04L 1/0026 370/329 |
| 2013/0117622 A1* | 5/2013 | Blankenship | H03M 13/136 714/751 |
| 2013/0215807 A1* | 8/2013 | Yang | H04L 1/0026 370/281 |
| 2013/0223299 A1* | 8/2013 | Yang | H04L 1/1685 370/280 |
| 2013/0230033 A1* | 9/2013 | Lee | H04L 5/0055 370/336 |
| 2013/0242816 A1* | 9/2013 | He | H04W 52/243 370/280 |
| 2013/0242822 A1* | 9/2013 | Yang | H04L 1/1607 370/280 |
| 2013/0258914 A1* | 10/2013 | Seo | H04L 1/1896 370/280 |
| 2013/0336160 A1* | 12/2013 | Yin | H04L 1/1854 370/254 |

FOREIGN PATENT DOCUMENTS

| | | |
|---|---|---|
| KR | 10-2011-0068839 A | 6/2011 |
| KR | 10-2011-0069834 A | 6/2011 |
| WO | WO 2010/101411 A2 | 9/2010 |
| WO | WO 2011/049354 A2 | 4/2011 |
| WO | WO 2011/074839 A2 | 6/2011 |

OTHER PUBLICATIONS

Samsung, "HARQ-ACK Multiplexing in PUSCH for "Mode a" and "Mode b" in TDD", 3GPP TSG RAN WG1 #65, R1-111454, Barcelona, Spain, May 9-13, 2011, pp. 1-5.

ZTE et al., "Corrections on UE procedure for reporting HARQ-ACK," 3GPP TSG-RAN WG1 Meeting #66, Aug. 22-26, 2011, 8 pages, R1-112849.

Ericsson et al., "PUCCH Resource Mapping," 3GPP TSG-RAN WG1 #69, R1-121988, Prague, Czech Republic, May 21-25, 2012, 3 pages.

* cited by examiner

| SF index | 0 | 1 | 2 | 3 | 4 | 5 | 6 | 7 | 8 | 9 |
|---|---|---|---|---|---|---|---|---|---|---|
| PCC (Cfg 3) | D | S | U | U | U | D | D | D | D | D |
| DL association set index | | | (7,6,11) | (6,5) | (5,4) | | | | | |

| | 0 | 1 | 2 | 3 | 4 | 5 | 6 | 7 | 8 | 9 |
|---|---|---|---|---|---|---|---|---|---|---|
| SCC (Cfg 3) | D | S | U | U | U | D | D | D | D | D |
| DL association set index | | | (7,6,11) | (6,5) | (5,4) | | | | | |

* When a first condition is met :
  L1 = min (M1, W), L2 = min (M2, W)

* When a second condition is met :
  L1 = L2 = W

* When a first condition is met:
  the number of per-CC HARQ-ACK bit(s) is determined using min(W, Mc)

* When a second condition is met:
  the number of per-CC HARQ-ACK bit(s) is determined using $\min(W + 4 \lceil (U_{max} - W/4) \rceil, Mc)$

METHOD FOR TRANSMITTING CONTROL INFORMATION AND APPARATUS FOR SAME

CROSS REFERENCE TO RELATED APPLICATIONS

This application is a Continuation of copending U.S. application Ser. No. 14/238,652 filed on Feb. 12, 2014, which was filed as the National Phase of PCT International Application No. PCT/KR2012/007676 filed on Sep. 24, 2012, which claims priority under 35 U.S.C. 119(e) to U.S. Provisional Application No. 61/538,142 filed on Sep. 23, 2011, to U.S. Provisional Application No. 61/544,254 filed on Oct. 6, 2011, to U.S. Provisional Application No. 61/586,825 filed on Jan. 15, 2012, to U.S. Provisional Application No. 61/620,996 filed on Apr. 6, 2012, to U.S. Provisional Application No. 61/658,424 filed on Jun. 12, 2012, to U.S. Provisional Application No. 61/671,103 filed on Jul. 13, 2012, to U.S. Provisional Application No. 61/678,592 filed on Aug. 1, 2012, to U.S. Provisional Application No. 61/696,313 filed on Sep. 4, 2012 and under 35 U.S.C. 119(a) to Patent Application No. 10-2012-0106159 filed in the Republic of Korea on Sep. 24, 2012, all of which are incorporated by reference herein in its entirety.

BACKGROUND OF THE INVENTION

The present invention relates to a wireless communication system, and more particularly, to a method for transmitting control information and an apparatus for the same.

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include code division multiple access (CDMA), frequency division multiple access (FDMA), time division multiple access (TDMA), orthogonal frequency division multiple access (OFDMA), single carrier frequency division multiple access (SC-FDMA), etc.

SUMMARY OF THE INVENTION

An object of the present invention is to provide a method and apparatus for efficiently transmitting control information in a wireless communication system. Another object of the present invention is to provide a method and apparatus for efficiently transmitting uplink control information in a time division duplex (TDD) system and efficiently managing resources for the UL control information. It will be appreciated by persons skilled in the art that both the foregoing general description and the following detailed description of the present invention are exemplary and explanatory and are intended to provide further explanation of the invention as claimed.

In an aspect of the present invention, provided is a method for transmitting uplink control information in a wireless communication system supporting carrier aggregation and operating in time division duplex (TDD), the method including generating a first hybrid automatic repeat request-acknowledgement (HARQ-ACK) set for a first cell using an L1 value, generating a second HARQ-ACK set for a second cell using an L2 value, and transmitting bit values corresponding to the first and second HARQ-ACK sets through a physical uplink shared channel (PUSCH) in a subframe n, wherein L1=min (M1, W) and L2=min (M2, W) when a value W of an uplink downlink assignment index (UL DAI) corresponding to the PUSCH is 1 or 2, wherein L1=L2=W when the value W of the UL DAI corresponding to the PUSCH is 3 or 4, wherein min (A, B) represents a smallest number from A and B, wherein M1 corresponds to the number of downlink subframes corresponding to an uplink subframe n on the first cell and M2 corresponds to the number of downlink subframes corresponding to the uplink subframe n on the second cell, and wherein the first cell and the second cell have different uplink-downlink configurations.

In another aspect of the present invention, provided herein is a communication apparatus configured to transmit uplink control information in a wireless communication system supporting carrier aggregation and operating in time division duplex (TDD), the communication apparatus including a radio frequency (RF) unit, and a processor, wherein the processor is configured to generate a first hybrid automatic repeat request-acknowledgement (HARQ-ACK) set for a first cell using an L1 value, to generate a second HARQ-ACK set for a second cell using an L2 value, and to transmit bit values corresponding to the first and second HARQ-ACK sets through a physical uplink shared channel (PUSCH) in a subframe n, wherein L1=min (M1, W) and L2=min (M2, W) when a value W of an uplink downlink assignment index (UL DAI) corresponding to the PUSCH is 1 or 2, wherein L1=L2=W when the value W of the UL DAI corresponding to the PUSCH is 3 or 4, wherein min (A, B) represents a smallest number from A and B, wherein M1 corresponds to the number of downlink subframes corresponding to an uplink subframe n on the first cell and M2 corresponds to the number of downlink subframes corresponding to the uplink subframe n on the second cell, and wherein the first cell and the second cell have different uplink-downlink configurations.

Each bit of the bit values may correspond to each HARQ-ACK response in the first HARQ-ACK set and the second HARQ-ACK set when W is 1 or 2.

Spatial bundling may be applied to at least one of the first cell and the second cell during generation of a HARQ-ACK set when W is 2, and the at least one cell may be configured in such a way that a maximum number of transport blocks that can be transmitted in one subframe is a plural number.

A 4-bit value corresponding to a third HARQ-ACK set including the first HARQ-ACK set and the second HARQ-ACK set may be transmitted when W is 3 or 4, and the third HARQ-ACK set may include 2 W HARQ-ACK responses.

The first cell may be a primary cell (PCell) and the second cell may be a secondary cell (SCell).

The method may be performed by a communication apparatus configured to transmit HARQ-ACK using a channel selection scheme.

According to the present invention, control information may be efficiently transmitted in a wireless communication system. Specifically, uplink (UL) control information may be efficiently transmitted in a wireless communication system and resources for the UL control information may be efficiently managed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 12 illustrates an exemplary full duplex (FD)-TDD CA configuration;

FIGS. 13A and 13B illustrate exemplary channel selection based-A/N transmission in TDD CA;

DETAILED DESCRIPTION OF THE INVENTION

Figure 1:
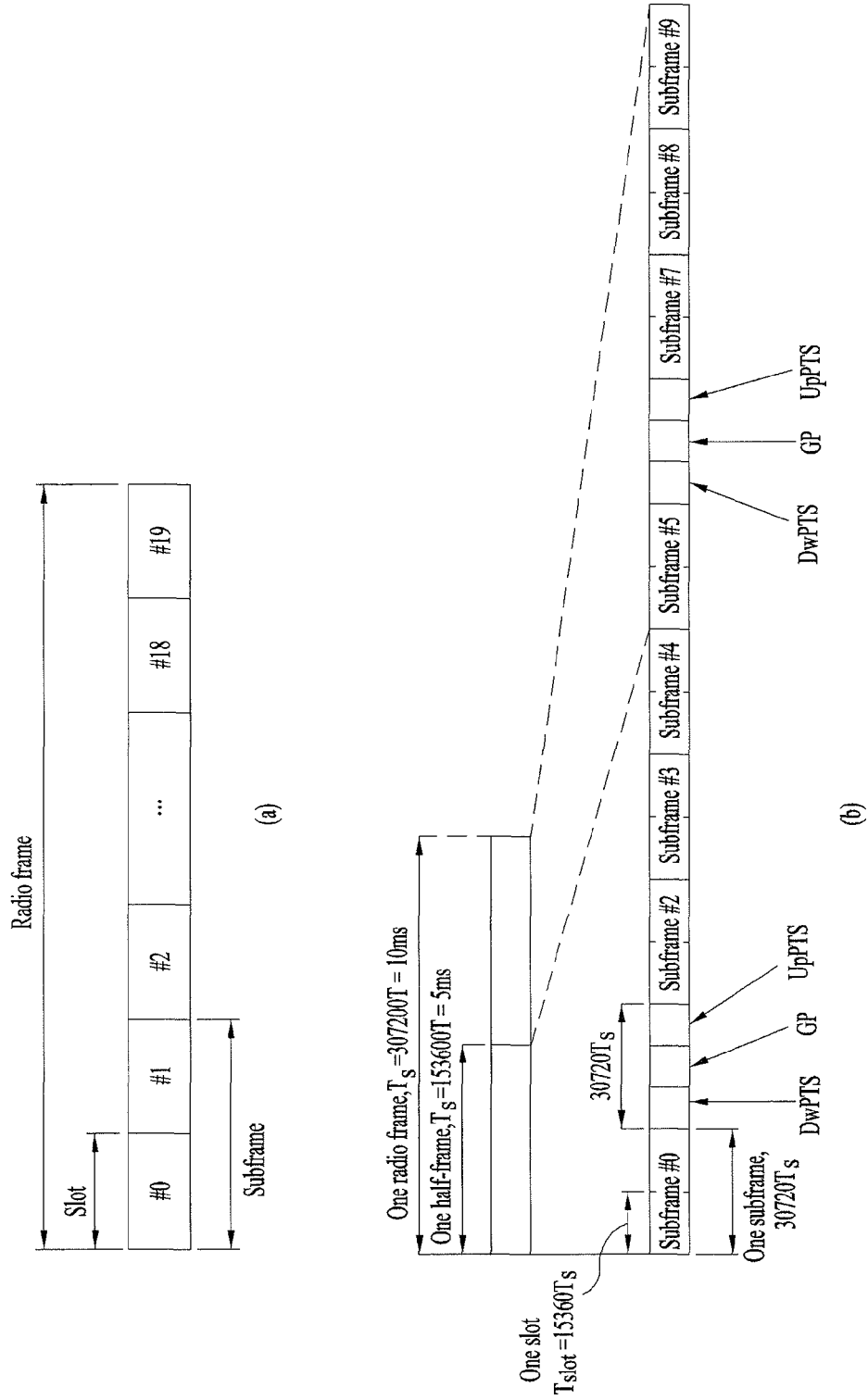
FIG. 1 illustrates an exemplary radio frame structure.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the present invention will be described in terms of 3GPP LTE/LTE-A, but is not limited thereto. Specific terms used in the embodiments of the present invention are provided to aid in the understanding of the present invention. These specific terms may be replaced with other terms within the scope and spirit of the present invention.

First, terms used in this specification are summarized as follows.

Hybrid automatic repeat request acknowledgement (HARQ-ACK): This means a reception response result of downlink transmission (e.g., physical downlink shared channel (PDSCH) or semi-persistent scheduling release physical downlink control channel (SPS release PDCCH), that is, an acknowledgement/negative ACK/discontinuous transmission (ACK/NACK/DTX) response (briefly, an ACK/NACK response, ACK/NACK, an A/N response, and A/N). The ACK/NACK response refers to ACK, NACK, DTX, or NACK/DTX. HARQ-ACK for a component carrier (CC) or HARQ-ACK of a CC refers to an ACK/NACK response to DL transmission associated with the corresponding CC (e.g., scheduled for the corresponding CC). A PDSCH may be replaced with a transport block or a codeword (CW).

PDSCH: This means a PDSCH corresponding to a DL grant PDCCH. Throughout this specification, PDSCH is used interchangeably with PDSCH w/ PDCCH.

SPS release PDCCH: This indicates to a PDCCH for indicating SPS release. A user equipment (UE) transmits ACK/NACK information for the SPS release PDCCH as UL feedback.

SPS PDSCH: This means a PDSCH transmitted in DL using resources that are configured semi-statically by SPS. The SPS PDSCH has no corresponding DL grant PDCCH. Throughout this specification, SPS PDSCH is interchangeably used with PDSCH w/o PDCCH.

Downlink assignment index (DAI): This is contained in downlink control information (DCI) transmitted via a PDCCH. The DAI may indicate an order value or counter value of the PDCCH. For convenience, a value indicated by a DAI field in a DL grant PDCCH is referred to as DL DAI (briefly, V) and a value indicated by a DAI field in a UL grant PDCCH is referred to as UL DAI (briefly, W).

Primary component carrier (PCC) PDCCH: This means a PDCCH for scheduling a PCC. That is, the PCC PDCCH refers to a PDCCH corresponding to a PDSCH on the PCC. Assuming that cross-carrier scheduling is not allowed for the PCC, the PCC PDCCH is transmitted on the PCC. PCC is used interchangeably with primary cell (PCell).

Secondary component carrier (SCC) PDCCH: This means a PDCCH for scheduling an SCC. That is, the SCC PDCCH refers to a PDCCH corresponding to a PDSCH on the SCC. When cross-carrier scheduling is allowed for the SCC, the SCC PDCCH may be transmitted on a CC (e.g., a PCC) except for the corresponding SCC. When cross-carrier scheduling is not allowed for the SCC, the SCC PDCCH is transmitted on the corresponding SCC only. SCC is used interchangeably with secondary cell (SCell).

Cross-CC scheduling: This means an operation of transmitting a PDCCH for scheduling an SCC through a CC (e.g., a PCC) except for the corresponding SCC. The cross-CC scheduling refers to an operation of scheduling/transmitting all PDCCHs through only one PCC when only two CCs including a PCC and an SCC are present.

Non-cross-CC scheduling: This means an operation of scheduling/transmitting PDCCHs for scheduling CCs through the respective corresponding CCs.

FIG. 1 illustrates an exemplary radio frame structure. In a cellular OFDM wireless packet communication system, uplink/downlink data packet transmission is performed on a subframe basis, and one subframe is defined as a predetermined time period including a plurality of OFDM symbols. LTE(-A) supports a type-1 radio frame structure for frequency division duplex (FDD) and a type-2 radio frame structure for time division duplex (TDD).

FIG. 1(a) illustrates a type-1 radio frame structure. A radio frame comprises 10 subframes, and one subframe comprises two slots in the time domain. A unit time during which one subframe is transmitted is defined as a transmission time interval (TTI). For example, one subframe may be 1 ms in duration and one slot may be 0.5 ms in duration. A slot may include a plurality of orthogonal frequency division multiplexing (OFDM) symbols in the time domain. Because the 3GPP LTE system adopts OFDMA for DL, an OFDM symbol represents one symbol period. An OFDM symbol may be referred to as an SC-FDMA symbol or symbol period on UL. A resource block (RB) is a resource allocation unit including a plurality of contiguous subcarriers in a slot.

The number of OFDM symbols included in one slot may vary depending on a channel bandwidth and a cyclic prefix (CP) length. For example, in case of a normal CP, one slot includes 7 OFDM symbols. In case of an extended CP, one slot includes 6 OFDM symbols.

FIG. 1(b) illustrates a type-2 radio frame structure. A type-2 radio frame includes two half frames, each having 5 subframes. Each subframe includes two slots.

Table 1 below shows an uplink-downlink configuration (UL-DL Cfg) in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, U represents a uplink subframe, and S represents a special subframe.

The special subframe includes a downlink pilot timeslot (DwPTS), a guard period (GP), and an uplink pilot timeslot (UpPTS). The DwPTS is a time period reserved for DL transmission and the UpPTS is a time period reserved for uplink transmission.

Table 2 shows lengths of DwPTS/GP/UpPTS according to a special subframe configuration. In Table 2, Ts represents a sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The above-described radio frame structure is purely exemplary and thus the number of subframes in a radio frame, the number of slots in a subframe, or the number of symbols in a slot may vary in different ways.

Figure 2:
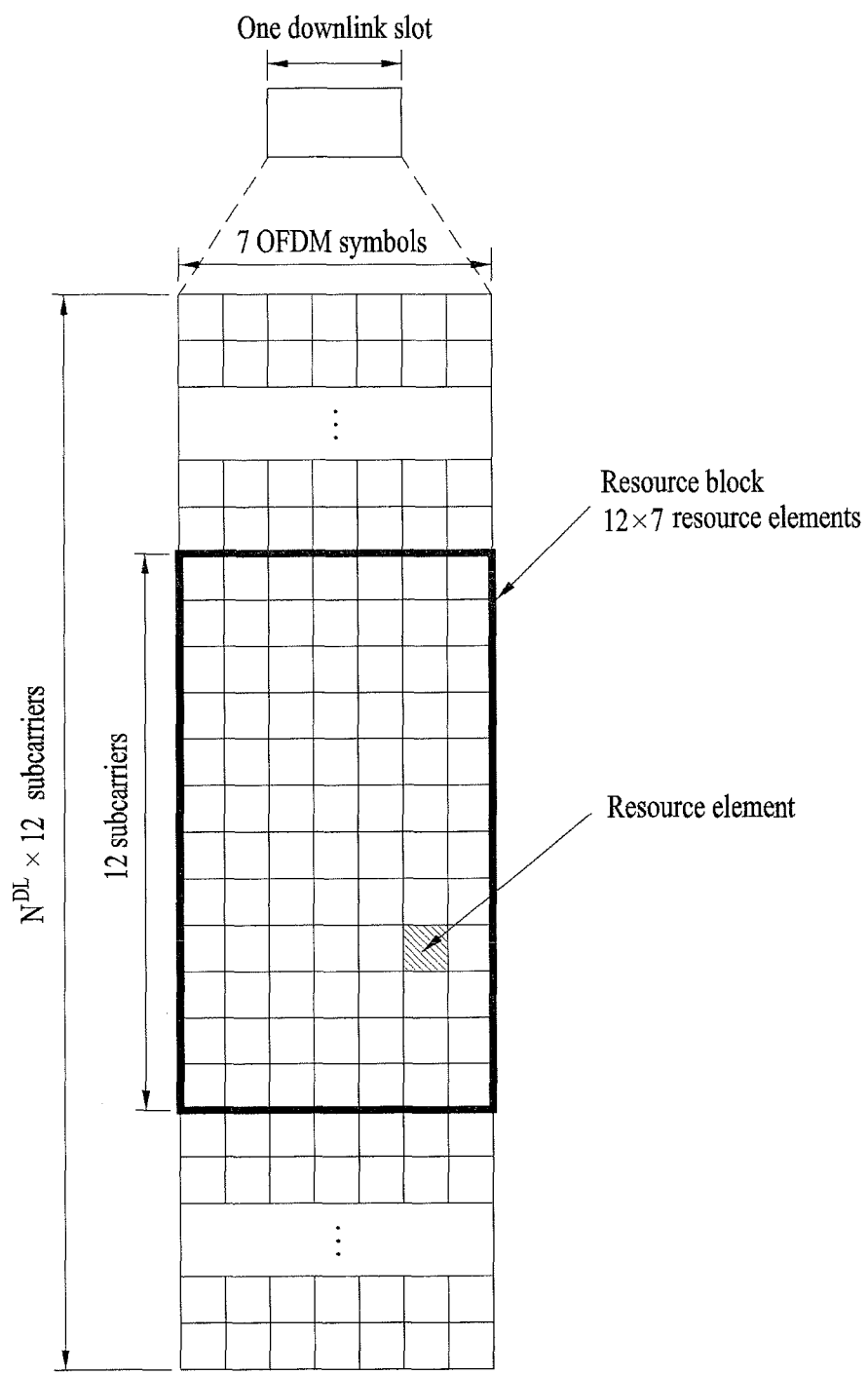
FIG. 2 illustrates a resource grid of one DL slot.

FIG. 2 illustrates a resource grid of one downlink slot.

Referring to FIG. 2, a downlink slot includes a plurality of OFDM symbols in the time domain. One downlink slot may include 7(6) OFDM symbols and a resource block (RB) may include 12 subcarriers in the frequency domain. Each element of the resource grid is referred to as a Resource Element (RE). One RB includes 12×7 (6) REs. The number of RBs in a downlink slot, NRB, depends on a downlink transmission bandwidth. A UL slot may have the same structure as a downlink slot, except that an OFDM symbol is replaced by an SC-FDMA symbol.

Figure 3:
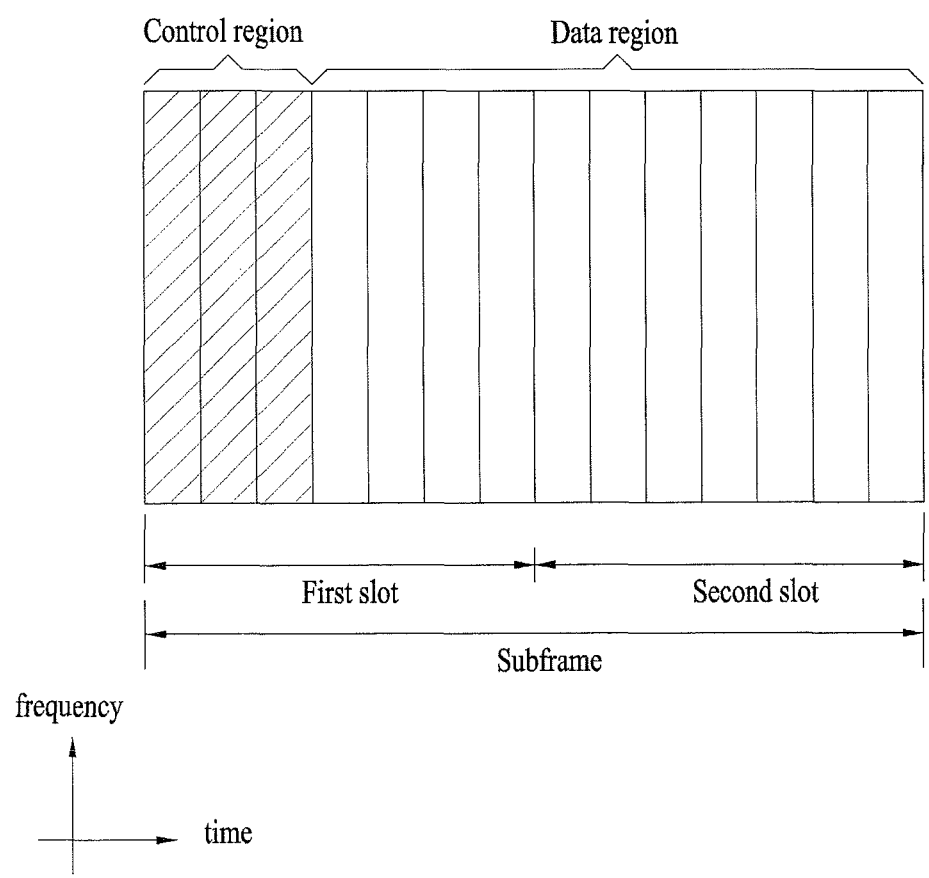
FIG. 3 illustrates a downlink subframe structure.

FIG. 3 illustrates a downlink (DL) subframe structure.

Referring to FIG. 3, up to 3(4) OFDM symbols at the start of the first slot of a subframe correspond to a control region to which control channels are allocated and the other OFDM symbols of the downlink subframe correspond to a data region to which a physical downlink shared channel (PDSCH) is allocated. Examples of the downlink control channel may include physical control format indicator channel (PCFICH), physical downlink control channel (PDCCH), physical hybrid automatic repeat request (HARQ) indicator channel (PHICH), etc. The PCFICH is transmitted in the first OFDM symbol of a subframe, carrying information about the number of OFDM symbols used for transmission of control channels in the subframe. The PHICH delivers a hybrid automatic repeat request acknowledgment/negative-acknowledgment (HARQ ACK/NACK) signal in response to a uplink transmission.

Control information transmitted via PDCCH is called downlink control information (DCI). As a DCI format, formats 0, 3, 3A, and 4 for uplink and formats 1, 1A, 1B, 1C, 1D, 2, 2A, 2B, and 2C for downlink are defined. The DCI format optionally includes hopping flag, RB allocation, modulation coding scheme (MCS), redundancy version (RV), new data indicator (NDI), transmit power control (TPC), cyclic shift for demodulation reference signal (DMRS), channel quality information (CQI) request, HARQ process number, transmitted precoding matrix indicator (TPMI), precoding matrix indicator (PMI), etc. according to its usage.

The PDCCH delivers information about resource allocation and a transmission format for a downlink shared channel (DL-SCH), information about resource allocation for an uplink shared channel (UL-SCH), paging information of a paging channel (PCH), system information on the DL-SCH, information about resource allocation for a higher-layer control message such as a random access response transmitted on the PDSCH, a set of TPC commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is transmitted in an aggregate of one or more contiguous control channel elements (CCEs). A CCE is a logical allocation unit used to provide a PDCCH at a coding rate based on the state of a radio channel. A CCE corresponds to a plurality of resource element group (REGs). The format of a PDCCH and the number of available bits for the PDCCH are determined according to the number of CCEs. An eNB determines a PDCCH format according to DCI transmitted to a UE and adds a cyclic redundancy check (CRC) to control information. The CRC is masked by an identifier (ID) known as radio network temporary identifier (RNTI) according to the owner or usage of the PDCCH. For example, if the PDCCH is directed to a specific UE, its CRC may be masked by a Cell-RNTI (C-RNTI) of the UE. If the PDCCH is used for a paging message, the CRC of the PDCCH may be masked by a paging ID (e.g., paging-RNTI (P-RNTI)). If the PDCCH carries system information, particularly, a system information block (SIB), its CRC may be masked by a system information ID and a system information RNTI (SI-RNTI). To indicate that the PDCCH carries a random access response, its CRC may be masked by a random access-RNTI (RA-RNTI).

Figure 4:
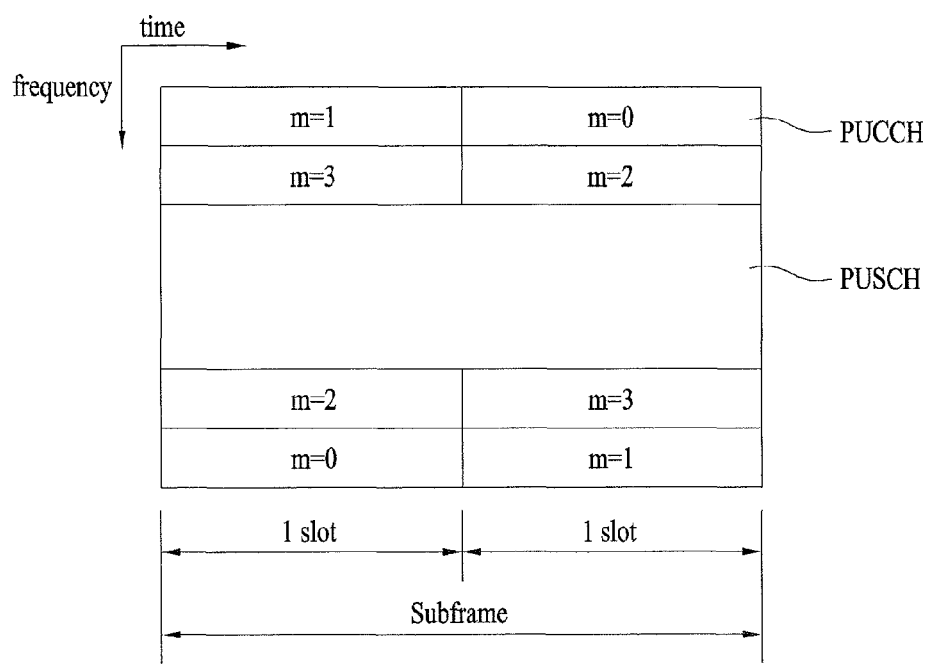
FIG. 4 illustrates a uplink subframe structure used in LTE.

FIG. 4 illustrates a uplink (UL) subframe structure used in LTE.

Referring to FIG. 4, a UL subframe includes plural (e.g., 2) slots. Each slot may include SC-FDMA symbols, the number of which varies depending on the length of a CP. The UL subframe may be divided into a control region and a data region in the frequency domain. The data region includes a physical uplink shared channel (PUSCH) and is used to transmit a data signal such as voice, etc. The control region includes a physical uplink control channel (PUCCH) and is used to transmit uplink control information (UCI). The PUCCH includes an RB pair located at opposite ends of the data region on a frequency axis and is hopped over a slot The PUCCH may be used to transmit the following control information.

Scheduling request (SR): This means information used to request UL-SCH resources. The SR is transmitted using an on-off keying (OOK) scheme.

HARQ ACK/NACK: This means a response signal to a DL data packet on a PDSCH. The HARQ ACK/NACK indicates whether the DL data packet is successfully received. 1-bit ACK/NACK is transmitted in response to a single DL codeword (CW) and 2-bit ACK/NACK is transmitted in response to two DL CWs.

Channel quality indicator (CQI): This means feedback information about a DL channel. Multiple input multiple output (MIMO) associated feedback information includes rank indicator (RI), precoding matrix indicator (PMI), precoding type indicator (PTI), etc. 20 bits are used per subframe.

Table 3 below shows a mapping correlation between a PUCCH format and UCI in LTE.

TABLE 3

| PUCCH format | Uplink control information (UCI) |
| --- | --- |
| Format 1 | Scheduling request (SR) (non-modulated waveform) |
| Format 1a | 1-bit HARQ ACK/NACK (SR is present/not present) |
| Format 1b | 2-bit HARQ ACK/NACK (SR is present/not present) |
| Format 2 | CSI (20 coded bits) |
| Format 2 | CSI and 1- or 2-bit HARQ ACK/NACK (20 bits) (corresponding to extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3(LTE-A) | HARQ ACK/NACK + SR (48 bits) |

Since an LTE UE cannot simultaneously transmit a PUCCH and a PUSCH, when UCI (e.g., CQI/PMI, HARQ-ACK, RI, etc.) needs to be transmitted in a subframe for transmitting a PUSCH, the UCI is multiplexed in a PUSCH region (PUSCH piggy back). An LTE-A UE may also be configured so as not to simultaneously transmit a PUCCH and a PUSCH. In this case, when UCI (e.g., CQI/PMI, HARQ-ACK, RI, etc.) needs to be transmitted in a subframe for transmitting a PUSCH, a UE may multiplex the UCI in a PUSCH region (PUSCH piggy back).

Figure 5:
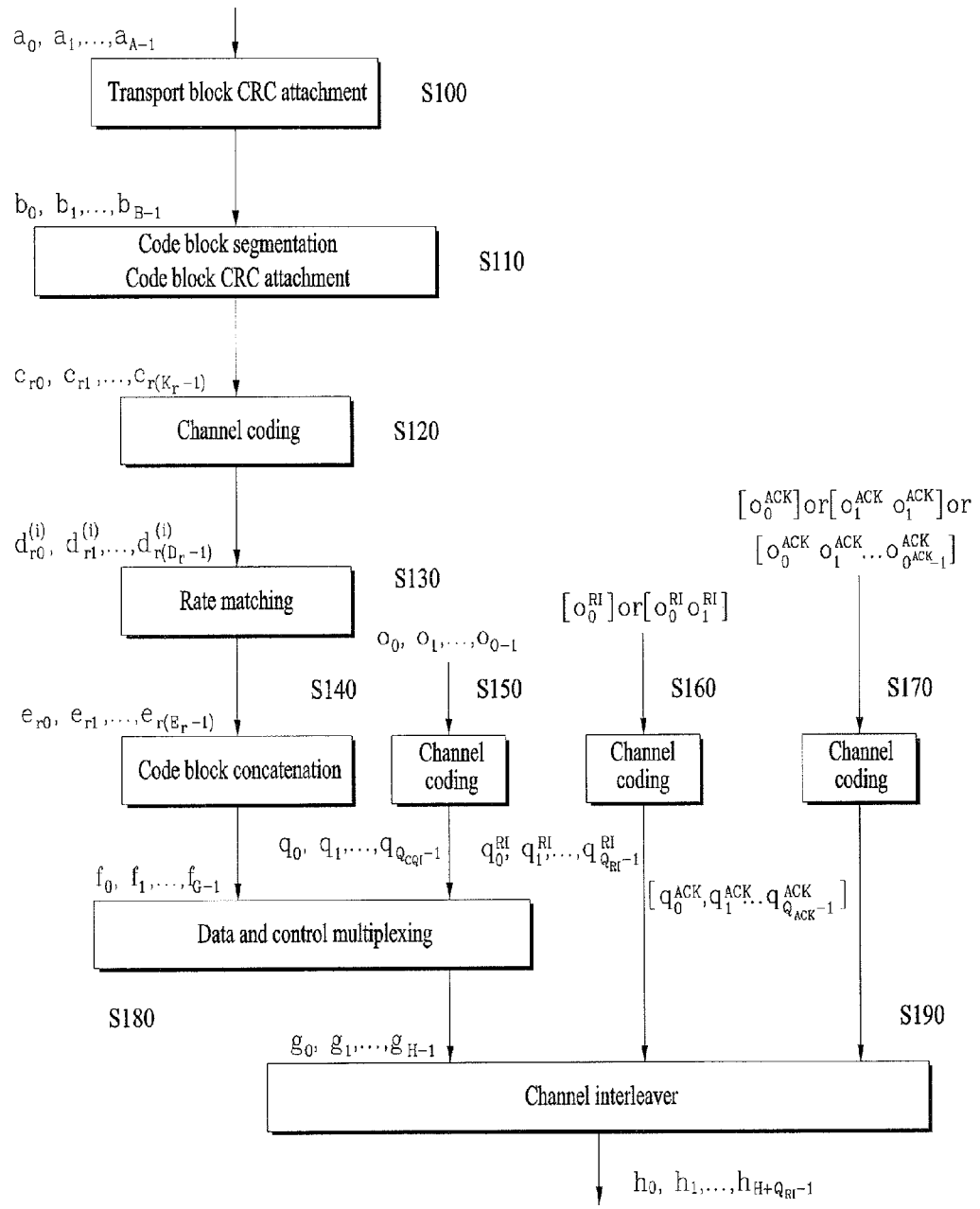
FIG. 5 illustrates an exemplary operation for processing UL-SCH data and control information.

FIG. 5 illustrates an exemplary operation for processing UL-SCH data and control information.

Referring to FIG. 5, error detection is transmitted to a UL-SCH transport block (TB) throughs cyclic redundancy check (CRC) attachment (S100).

All TBs are used to calculate CRC parity bits. TB bits are $a_0, a_1, a_2, a_3, \ldots, a_{A-1}$. Parity bits are $p_0, p_1, p_2, p_3, \ldots, p_{L-1}$. The size of the TB is A and the number of parity bits is L.

After CRC attached to the TB, the TB is segmented into code blocks (CBs) and CRC is attached to the CBs (S110). Input bits of the CB segmentation are $b_0, b_1, b_2, b_3, \ldots, b_{B-1}$. B is the number of TB bits (including the CRC). The resulting bits of the CB segmentation are $c_{r0}, c_{r1}, c_{r2}, c_{r3}, \ldots, c_{r(Kr-1)}$. r is the index of a CB (r=0, 1, ..., C−1), $K_r$ is the number of bits in code block r. C is the total number of code blocks.

Channel coding is performed after the code block segmentation and the code block CRC (S120). The resulting bits of the channel coding are $d^{(i)}_{r0}, d^{(i)}_{r1}, d^{(i)}_{r2}, d^{(i)}_{r3}, \ldots, d^{(i)}_{r(Kr-1)}$. i=0, 1, 2, $D_r$ is the number of bits in an $i^{th}$ coded data stream for code block r (i.e., $D_r=K_r+4$). r is the index of a CB (r=0, 1, ..., C−1), $K_r$ is the number of bits in code block r. C is the total number of code blocks. Turbo coding may be used for channel coding.

After the channel encoding, rate matching is performed (S130). The rate-matched bits are $e_{r0}, e_{r1}, e_{r2}, e_{r3}, \ldots, e_{r(Er-1)}$. $E_r$ is the number of rate-matched bits in code block r, r=0, 1, ..., C−1, and C is the total number of code blocks.

Code block concatenation is performed after the rate matching (S140). The bits become $f_0, f_1, f_2, f_3, \ldots, f_{G-1}$ after code block concatenation. G is the total number of coded bits for transmission. If control information is multiplexed with the UL-SCH data, the bits of the control information are not included in G. $f_0, f_1, f_2, f_3, \ldots, f_{G-1}$ correspond to a UL-SCH codeword.

Channel quality information (a CQI and/or a PMI) ($o_0, o_1, \ldots, o_{O-1}$), RI ($[o^{RI}_0]$ or $[o^{RI}_0 \, o^{RI}_1]$) and HARQ-ACK ($[o^{ACK}_0]$ or $[o^{ACK}_0 \, o^{ACK}_1]$ or $[o^{ACK}_0 \, o^{ACK}_1 \ldots o^{ACK}_{OACK-1}]$) as UCI are channel-encoded independently (S150 to S170). Channel coding of UCI is performed based on the number of code symbols for the control information. For example, the number of code symbols may be used for rate matching of the coded control information. The number of code symbols corresponds to the number of modulation symbols, the number of REs, etc. in subsequent operations.

HARQ-ACK is channel-coded using input bit sequence $[o^{ACK}_0], [o^{ACK}_0 \, o^{ACK}_1]$, or $[o^{ACK}_0 \, o^{ACK}_1 \ldots o^{ACK}_{OACK-1}]$ of S170. $[o^{ACK}_0]$ and $[o^{ACK}_0 \, o^{ACK}_1]$ represent a 1-bit HARQ-ACK and 2-bit HARQ-ACK, respectively. In addition, $[o^{ACK}_0 \, o^{ACK}_1 \ldots o^{ACK}_{OACK-1}]$ represent HARQ-ACK containing information having more than 3 bits (i.e., $O^{ACK}>2$). An ACK is encoded to 1 and a NACK is encoded to 0. The 1-bit HARQ-ACK is subject to repetition coding. The 2-bit HARQ-ACK is encoded with a (3, 2) simplex code and then may be cyclically repeated. In case of $O^{ACK}>2$, a (32,O) block code is used.

$Q_{ACK}$ is the total number of HARQ-ACK coded bits and a bit sequence $q^{ACK}_0, q^{ACK}_1, q^{ACK}_2, \ldots q^{ACK}_{QACK-1}$ is obtained by concatenating a HARQ-ACK CB(s). To match the length of the HARQ-ACK bit sequence to $Q_{ACK}$, the last concatenated HARQ-ACK CB may be a part (i.e. rate matching). $Q_{ACK}=Q'_{ACK}*Qm$ where $Q'_{ACK}$ is the number of HARQ-ACK code symbols and $Q_m$ is a modulation order for the HARQ-ACK. $Q_m$ is equal to the modulation order of the UL-SCH data.

A data/control multiplexing block receives the UL-SCH coded bits $f_0, f_1, f_2, f_3, \ldots, f_{G-1}$ and the CQI/PMI coded bits $q_0, q_1, q_2, q_3, \ldots, q_{CQI-1}$ (S180). The data/control multiplexing block outputs bits $g_0, g_1, g_2, g_3, \ldots, g_{H'-1}$. $g_i$ is a column vector of length $Q_m$ (i=0, ..., H'−1). H'=H/$Q_m$ where H=(G+$Q_{CQI}$). H is the total number of coded bits allocated for UL-SCH data and CQI/PMI.

The input of the channel interleaver is the output of the data/control multiplexing block, $g_0, g_1, g_2, g_3, \ldots, g_{H'-1}$, the coded RI $q^{RI}_0, q^{RI}_1, q^{RI}_2, \ldots, q^{RI}_{QRI-1}$, and the coded HARQ-ACK $q^{ACK}_0, q^{ACK}_1, q^{ACK}_2, \ldots, q^{ACK}_{Q'ACK-1}$ (S190). $g_i$ is the column vector of the CQI/PMI length $Q_m$ and i=0, ..., H'−1 (H'=H/Qm). $q^{ACK}_i$ is the column vector of the ACK/NACK length $Q_m$ and i=0, ..., $Q'_{ACK-1}$ ($Q'_{ACK}=Q_{ACK}/Qm$). $q^{RI}_i$ is the column vector of the RI length $Q_m$ and i=0, ..., $Q'_{RI-1}$ ($Q'_{RI}=Q_{RI}/Qm$).

The channel interleaver multiplexes the control information for PUSCH transmission and the UL-SCH data. Specifically, the channel interleaver maps the control information and the UL-SCH data to a channel interleaver matrix corresponding to PUSCH resources.

After the channel interleaving, a bit sequence $h_0, h_1, h_2, \ldots, h_{H+QRI-1}$ is output from the channel interleaver matrix column by column. The interleaved bit sequence is mapped to a resource grid. H"=H'+$Q'_{RI}$ modulation symbols are transmitted through a subframe.

Figure 6:
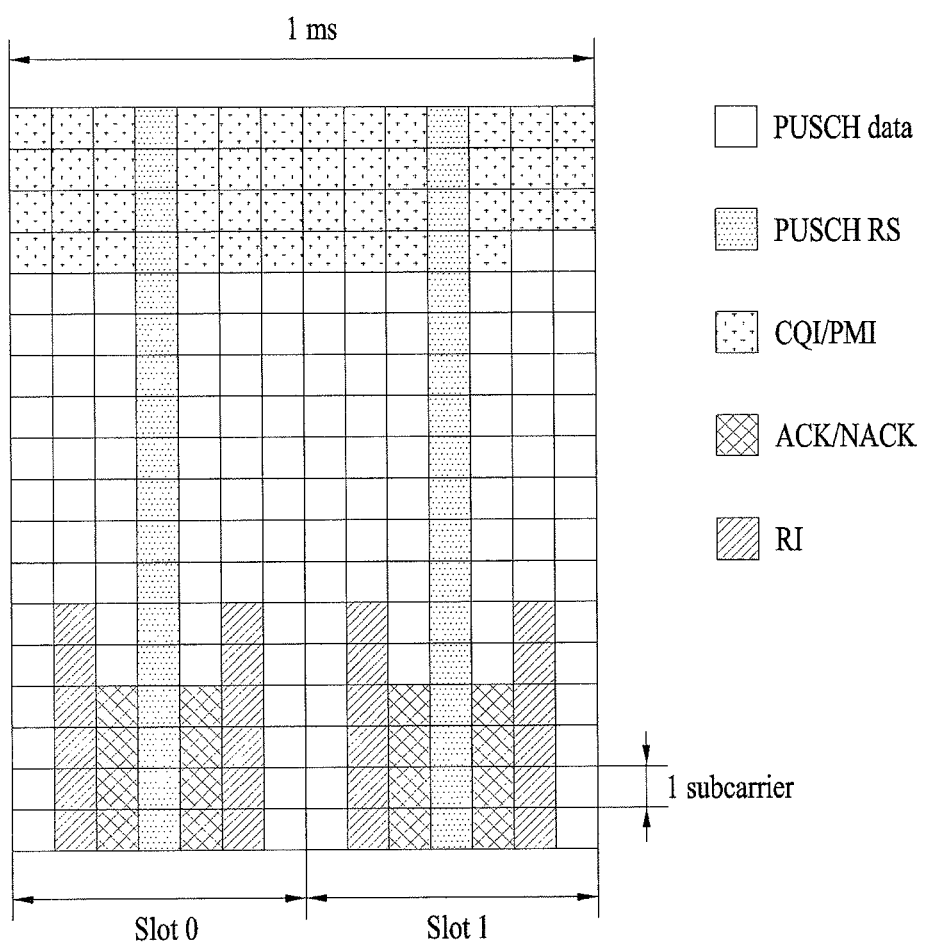
FIG. 6 illustrates an exemplary method for multiplexing UCI and UL-SCH data into a PUSCH.

FIG. 6 illustrates an exemplary method for multiplexing control information and UL-SCH data into a PUSCH. When a UE transmits control information in a subframe to which PUSCH transmission is allocated, the UE multiplexes control information (UCI) with UL-SCH data before DFT spreading. The control information includes at least one of a CQI/PMI, a HARQ-ACK/NACK, and an RI. The number of REs used for transmission of each of the CQI/PMI, the HARQ-ACK/NACK, and the RI is determined based on a modulation and coding scheme (MCS) for PUSCH transmission and an offset value. An offset value allows a different coding rate according to control information and is set semi-statically by higher-layer signaling (e.g. radio resource control (RRC) signaling). The UL-SCH data and the control information are not mapped to the same RE. The information is mapped to the two slots of a subframe.

Referring to FIG. 6, CQI and/or PMI (CQI/PMI) resources are located at the start of UL-SCH data resources. After a CQI/PMI is mapped sequentially to all SC-FDMA symbols of one subcarrier, it is mapped to a next subcarrier. The CQI/PMI is mapped from left to right, that is, in ascending order of SC-FDMA symbol indexes in a subcarrier. PUSCH data (UL-SCH data) is rate-matched in consideration of the amount of the CQI/PMI resources (i.e. the number of CQI/PMI code symbols). The same modulation order as the UL-SCH data is applied to the CQI/PMI. An ACK/NACK is inserted into a part of SC-FDMA resources to which the UL-SCH data is mapped by puncturing. The ACK/NACK is adjacent to RSs. In a corresponding SC-FDMA symbol, the ACK/NACK is filled from bottom to top, that is, in ascending order of subcarrier indexes. In the case of a normal CP, the ACK/NACK resides in SC-FDMA symbol #2/#5 in each slot, as illustrated in FIG. 6. A coded RI is located next to a symbol for the ACK/NACK irrespective of whether the ACK/NACK is actually transmitted in a subframe.

In LTE, control information (e.g., using QPSK modulation) may be scheduled to be transmitted on a PUSCH without UL-SCH data. The control (CQI/PMI, RI, and/or ACK/NACK) may be multiplexed before DFT-spreading in order to maintain low cubic metric (CM) single-subcarrier property. Multiplexing ACK/NACK, RI, and CQI/PMI is similar to FIG. 7. A SC-FDMA symbol for the ACK/NACK is located next to an RS and resources to which CQI is mapped may be punctured. The number of REs for the ACK/NACK and the RI is based on a reference MCS (CQI/PMI MCS) and an offset parameter. The reference MCS is calculated from CQI payload size and resource allocation. Channel coding and rate matching for control signaling without UL-SCH data are the same as the aforementioned control signaling with UL-SCH data.

Hereinafter, an ACK/NACK transmission procedure of a TDD system will be described. A TDD scheme uses the same frequency band that is divided into a DL subframe and a UL subframe in the time domain (refer to FIG. 1(b)). Accordingly, in case of DL/UL asymmetrical data traffic, more DL subframes may be allocated or more UL subframes may be allocated. Thus, in a TDD scheme, DL subframes and UL subframes may not correspond to each other in one-to-one correspondence. In particular, when the number of DL subframes is greater than the number of UL subframes, the UE may need to transmit an ACK/NACK response to a plurality of PDSCHs (and/or PDCCHs requesting the ACK/NACK response) within a plurality of DL subframes in one UL subframe. For example, according to a TDD configuration, DL subframes: UL subframes=M:1 may be configured. Here, M is the number of DL subframes corresponding to one UL subframe. In this case, the UE needs to transmit an ACK/NACK response to a plurality of PDSCHs (or PDCCHs requesting the ACK/NACK response) on M DL subframes in one UL subframe.

Figure 7:
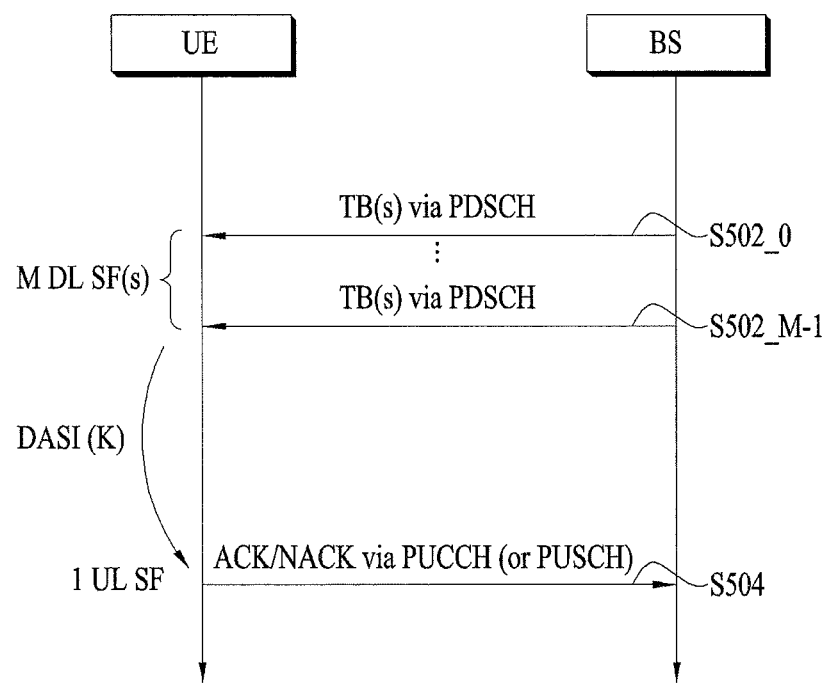
FIG. 7 illustrates a TDD UL ACK/NACK transmission procedure in a single cell situation.

FIG. 7 illustrates a TDD UL ACK/NACK transmission procedure in a single cell situation.

Referring to FIG. 7, a UE may receive one or more DL transmissions (e.g., PDSCH signals) within M DL subframes (SFs) (S502_0 to S502_M−1). Each PDSCH signal is used to transmit one or more (e.g., 2) transport blocks (TBs) (or codewords (CWs)) according to a transmission mode. In addition, although not illustrated, in S502_0 to S502_M−1, the UE may also receive a PDCCH signal requesting an ACK/NACK response, for example, a PDCCH signal (briefly, an SPS release PDCCH signal) indicating SPS release. When PDSCH signal and/or SPS release PDCCH signal is/are present in M DL subframes, the UE performs a procedure (e.g., ACK/NACK (payload) generation, ACK/NACK resource allocation, etc.) for transmitting the ACK/NACK and then, transmits the ACK/NACK in one UL subframe corresponding to the M DL subframes (S504). The ACK/NACK includes reception response information with respect to the PDSCH signal and/or SPS release PDCCH signal of S502_0 to S502_M−1. Although the ACK/NACK is basically transmitted via PUCCH (e.g., refer to FIGS. 5 and 6), the ACK/NACK may be transmitted via PUSCH when PUSCH transmission occurs at ACK/NACK transmission timing. Various PUCCH formats of Table 3 may be used for ACK/NACK transmission. In addition, in order to reduce a bit number of the transmitted ACK/NACK, various methods such as ACK/NACK bundling and ACK/NACK channel selection may be used.

As described above, in TDD, ACK/NACK for data received in the M DL subframes is transmitted through one UL subframe (i.e., M DL SF(s):1 UL SF) and a correlation therebetween is given by a downlink association set index (DASI).

Table 4 below shows DASI (K:{$k_0, k_1, \ldots k_{M-1}$}) defined in LTE(-A). Table 4 shows an interval from a DL subframe associated with a UL subframe for transmitting ACK/NACK. In detail, when PDSCH transmission and/or SPS release PDCCH are present in a subframe n-k (k∈K), the UE transmits ACK/NACK corresponding to a subframe n.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6, | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

According to the TDD scheme, the UE needs to transmit an ACK/NACK signal for one or more DL transmissions (e.g., PDSCH) received through M DL SFs through one UL SF. A method for transmitting the ACK/NACK for a plurality of DL SFs will now be described below.

1) ACK/NACK bundling: ACK/NACK bits for a plurality of data units (e.g., PDSCH, SPS release PDCCH, etc.) are concatenated via a logical operation (e.g., logical-AND operation). For example, when all data units are successfully decoded, a receiver (e.g., a UE) transmits an ACK signal. On the other hand, when decoding (or detection) of at least one of the data units fails, the receiver transmits a NACK signal or does not transmit any signal.

2) Channel selection: A UE that receives a plurality of data units (e.g., PDSCH, SPS release PDCCH, etc.) occupies a plurality of PUCCH resources for ACK/NACK transmission. An ACK/NACK response to the plural data units is identified by combination of PUCCH resources that are actually used for ACK/NACK transmission and the transmitted ACK/NACK content (e.g., a bit value and a QPSK symbol value). The channel selection scheme may also be referred to as an ACK/NACK selection scheme or a PUCCH selection scheme.

According to the TDD, when the UE transmits an ACK/NACK signal to a BS, the following problem may arise.

When the UE misses some of PDCCH(s) transmitted from the BS during several subframe periods, the UE cannot recognize that a PDSCH corresponding to the missed PDCCH has been transmitted to the UE, thereby causing errors during generation of ACK/NACK.

In order to overcome the errors, a TDD system adds a downlink assignment index (DAI) to a PDCCH. The DAI refers to an accumulated value (that is, a count) of PDCCH(s) indicating DL SPS release and PDCCH(s) corresponding to PDSCH(s) up to a current subframe in DL subframe (s) n-k (k⊂K). For example, when 3 DL subframes correspond to one UL subframe, PDSCHs transmitted in 3 DL subframes are sequentially indexed (i.e., sequentially counted) and are delivered via a PDCCH for scheduling a PDSCH. The UE may recognize whether PDCCHs have been successfully received so far based on DAI information contained in the PDCCHs. For convenience, the DAI contained in PDSCH-scheduling PDCCH and SPS release PDCCH is referred to as DL DAI, DAI-c (counter), or DAI.

Table 5 below shows a value $V^{DL}_{DAI}$ indicated by a DL DAI field. Throughout this specification, DL DAI may be simply denoted by V.

TABLE 5

| DAI<br>MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit. LSB: Least significant bit.

Figure 8:
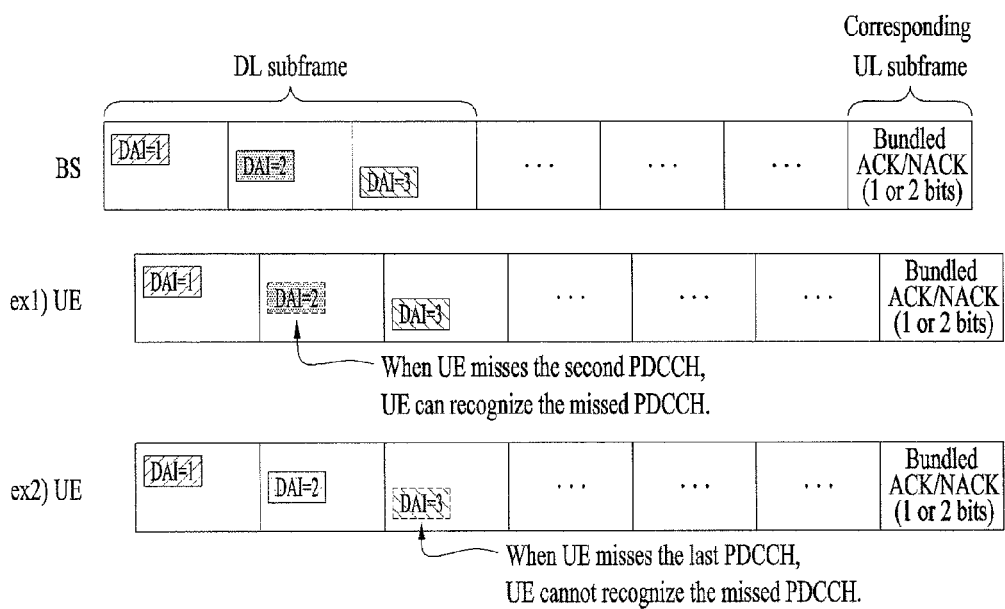
FIG. 8 illustrates exemplary ACK/NACK transmission using DL DAI.

FIG. 8 illustrates exemplary ACK/NACK transmission using DL DAI. In this example, it is assumed that a TDD system configured as 3 DL subframes: 1 UL subframe. For convenience, it is assumed that ACK/NACK is transmitted using a PUSCH resource. According to the conventional LTE, when ACK/NACK is transmitted through a PUSCH, 1-bit or 2-bit bundled ACK/NACK is transmitted.

Referring to FIG. 8, as in a first example, when a second PDCCH is missed, a DL DAI of a third PDCCH is not identical to the number of PDCCHs detected at a corresponding point in time, and thus, the UE can recognize that the second PDCCH is missed. In this case, the UE may process an ACK/NACK response to the second PDCCH as NACK (or NACK/DTX). On the other hand, as in a second example, when a last PDCCH is missed, DAI of a PDCCH that is lastly detected is identical to the number of PDCCHs detected at a corresponding point in time, and thus, the UE cannot recognize that the last PDCCH is missed (i.e., DTX). Thus, the UE recognizes that only 2 PDCCHs are scheduled during a DL subframe period. In this case, the UE bundles only ACK/NACK corresponding to the first two PDCCHs, thereby causing errors during ACK/NACK feedback. To address such a problem, a PUSCH-scheduling PDCCH (i.e., a UL grant PDCCH) includes a DAI field (for convenience, a UL DAI field). The UL DAI field is a 2-bit field and indicates information about the number of scheduled PDCCHs.

In detail, in case of $V^{UL}_{DAI} \neq (U_{DAI} + N_{SPS} - 1) \bmod 4 + 1$, the UE assumes that at least one DL allocation is missed (i.e., DTX generation) and generates NACK for all codewords according to a bundling procedure. Here, $U_{DAI}$ is the total number of SPS release PDCCHs and DL grant PDCCHs detected within subframe n-k (k⊂K)) (refer to Table 4 above). $N_{SPS}$ is the number of SPS PDSCHs and is 0 or 1.

Table 6 below shows a value $V^{UL}_{DAI}$ indicated by a UL DAI field. Throughout this specification, UL DAI may be briefly referred to as W.

TABLE 6

| DAI<br>MSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit. LSB: Least significant bit.

Figure 9:
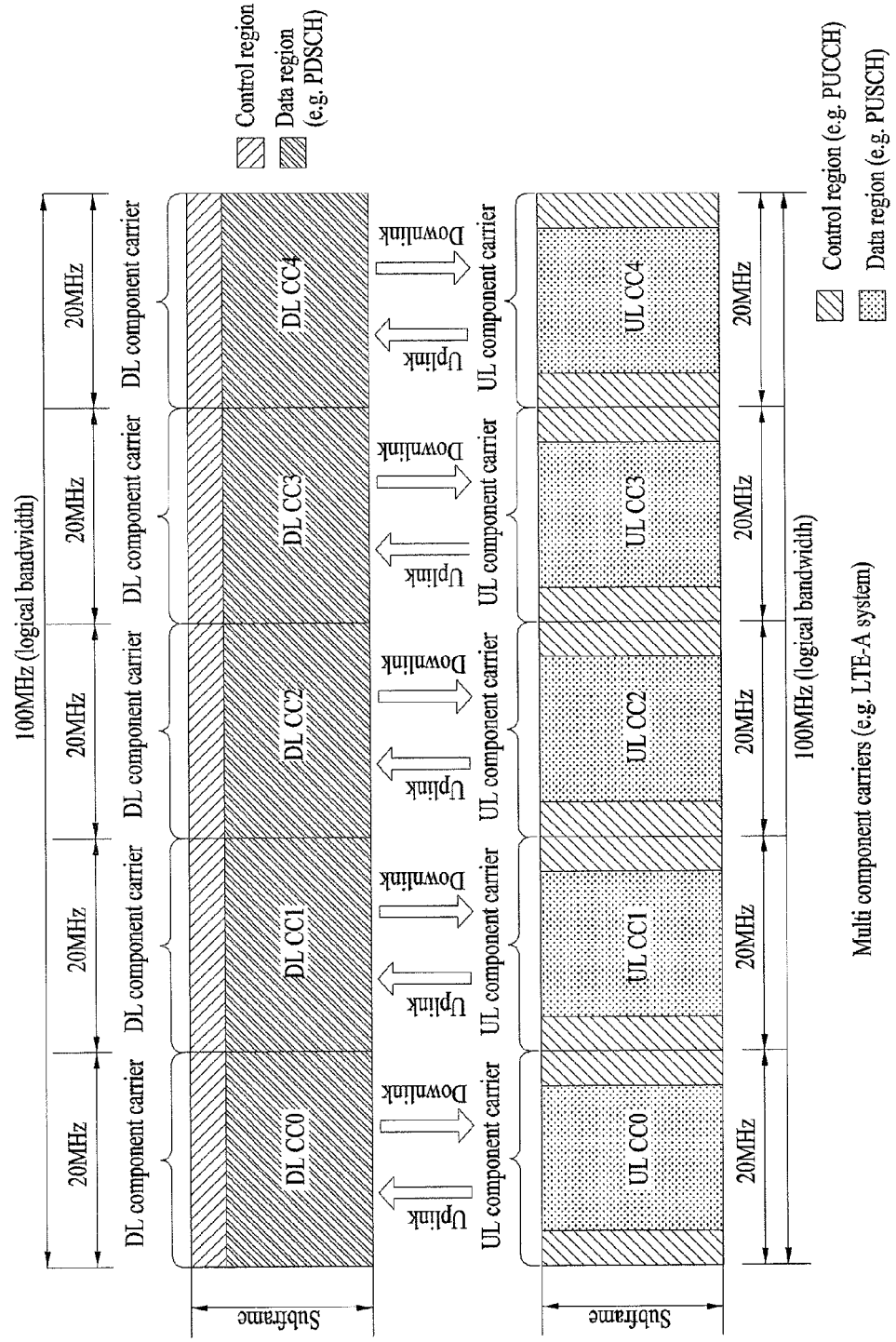
FIG. 9 illustrates an exemplary carrier aggregation (CA) communication system.

FIG. 9 illustrates an exemplary carrier aggregation (CA) communication system. LTE-A employs carrier aggregation or bandwidth aggregation technologies for aggregating a plurality of UL/DL frequency blocks to a broader UL/DL bandwidth in order to use a broader frequency band. Each frequency block is transmitted in a component carrier (CC). A CC may be regarded as a carrier frequency (or a center carrier or center frequency) for a corresponding frequency block.

Referring to FIG. 9, a broader UL/DL bandwidth may be supported by aggregating a plurality of UL/DL CCs. The CCs may be contiguous or non-contiguous in the frequency domain. The bandwidth of each CC may be configured independently. Asymmetrical CA is also possible by differentiating the number of UL CCs from the number of DL CCs. For example, given two DL CCs and one UL CC, the DL CCs are linked to the UL CC at 2:1. DL CC-UL CC linkage is fixed or configured semi-statically. Even though a total system band includes N CCs, a frequency band that a specific UE is allowed to monitor/receive may be limited to L(<N) CCs. Various parameters for carrier aggregation may be configured cell-specifically, UE group-specifically, or UE-specifically. Control information may be configured to be transmitted and received only on a specific CC. This specific CC may be referred to as a primary CC (PCC or anchor CC) and the other CC may be referred to as secondary CC (SCC).

LTE-A employs the concept of cell to manage radio resources [refer to 36.300 V10.2.0 (2010-12) 5.5. Carrier Aggregation; 7.5. Carrier Aggregation]. A cell is defined as a combination of DL and UL resources, while the UL resources are optional. Accordingly, a cell may include DL resources only or both DL and UL resources. If carrier aggregation is supported, the linkage between the carrier frequencies (or DL CCs) of DL resources and the carrier frequencies (or UL CCs) of UL resources may be indicated by system information. A cell operating in a primary frequency (or a PCC) may be referred to as a Primary Cell (PCell) and a cell operating in a secondary frequency (or an SCC) may be referred to as a secondary cell (SCell). The PCell is used for a UE to establish an initial connection or to re-establish a connection. The PCell may be a cell indicated during handover. The SCell may be configured after an RRC connection is established and used to provide additional radio resources. Both a PCell and an SCell may be collectively referred to as a serving cell. Accordingly, if carrier aggregation is not configured for a UE in RRC_CONNECTED state or the UE does not support carrier aggregation, one serving cell including only a PCell exists for the UE. On the other hand, if carrier aggregation is configured for a UE in RRC_CONNECTED state, there are one or more serving cells including a PCell and all SCells. For carrier aggregation, a network may configure one or more SCells for a UE by adding them to a PCell initially configured during connection establishment after initial security activation is initiated.

If cross-carrier scheduling (or cross-CC scheduling) is used, a DL assignment PDCCH may be transmitted on DL CC #0 and a PDSCH associated with the PDCCH may be transmitted on DL CC #2. For cross-CC scheduling, a carrier indicator field (CIF) may be introduced. The presence or absence of a CIF in a PDCCH may be determined semi-statically and UE-specifically (or UE group-specifically) by higher-layer signaling (e.g. RRC signaling). The baseline of PDCCH transmission is summarized as follows.

CIF disabled: a PDCCH on a DL CC allocates PDSCH resources of the same DL CC or PUSCH resources of one linked UL CC.

CIF enabled: a PDCCH on a DL CC may allocate PDSCH resources or PUSCH resources of a specific DL/UL CC from among a plurality of aggregated DL/UL CCs using a CIF.

In the presence of a CIF, an eNB may allocate a PDCCH monitoring DL CC set to a UE in order to reduce blind decoding (BD) complexity of the UE. The PDCCH monitoring DL CC set is a part of all aggregated DL CCs, including one or more DL CCs. The UE detects/decodes a PDCCH only on the DL CCs of the PDCCH monitoring DL CC set. That is, when an eNB schedules PDSCH/PUSCH to the UE, the PDCCH is transmitted on the PDCCH monitoring DL CC set only. The PDCCH monitoring DL CC set may be configured UE-specifically, UE group-specifically, or cell-specifically. The term 'PDCCH monitoring DL CC' may be replaced with an equivalent term such as monitoring carrier, monitoring cell, etc. In addition, the term CCs aggregated for a UE may be used interchangeably with an equivalent term such as serving CCs, serving carriers, serving cells, etc.

Figure 10:
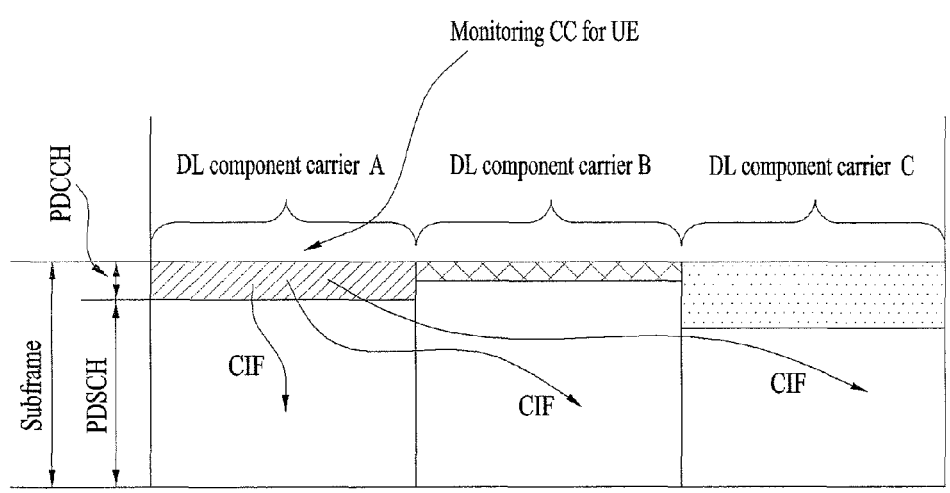
FIG. 10 illustrates exemplary cross-carrier scheduling.

FIG. 10 illustrates exemplary scheduling when a plurality of carriers are aggregated. It is assumed that three DL CCs are aggregated and DL CC A is configured as a PDCCH monitoring DL CC. DL CCs A, B, and C may be referred to as serving CCs, serving carriers, serving cells, etc. If CIF is disabled, each DL CC may carry only a PDCCH that schedules a PDSCH of itself without CIF according to an LTE PDCCH rule. On the other hand, if a CIF is enabled, DL CC A (i.e. the monitoring DL CC) may carry a PDCCH that schedules a PDSCH of another CC using CIF, as well as a PDCCH that schedules a PDSCH of DL CC A. In this case, no PDCCH is transmitted on DL CCs B and C that are not configured as a PDCCH monitoring DL CC.

Embodiment

A/N Transmission of CC (or Cells) Having Different UL-DL Configurations

In a TDD-based beyond LTE-A system, aggregation of a plurality of CCs that operate with different UL-DL configurations may be considered. In this case, A/N timings (i.e., UL SF timing for transmitting A/N in response to DL data transmitted through each DL SF) configured for a PCC and an SCC may differ according to UL-DL configurations of the corresponding CCs. For example, UL SF timing for transmitting A/N with respect to the same DL SF timing (or DL data transmitted in the same DL SF timing) may be differently configured for PCC and SCC. In addition, with respect to the same SF timing, link directions (i.e., DL or UL) of PCC and SCC may be differently configured. For example, a UL SF may be configured on SCC at a specific SF timing, while a DL SF may be configured on PCC at the corresponding SF timing.

In addition, in the TDD-based beyond LTE-A system, it may be considered supporting cross-CC scheduling in different TDD UL-DL configuration-based CA situation (for convenience, referred to as a different TDD CA). In this case, UL grant timing (DL SF timing for transmitting UL grant scheduling UL transmission) and PHICH timing (DL SF timing for transmitting a PHICH in response to UL data) that are configured for a monitoring CC (MCC) and an SCC may differ. For example, with respect to the same UL SF, a DL SF for transmitting UL grant/PHICH may be differently configured for MCC and SCC. In addition, a UL SF group that corresponds to UL grant or PHICH feedback transmitted in the same DL SF may be differently configured for MCC and SCC. In this case, with respect to the same SF timing, link directions of MCC and SCC may be differently configured. For example, a specific SF timing on SCC may be configured as a DL SF for transmitting UL grant/PHICH, while the corresponding SF timing on MCC may be configured as a UL SF.

When SF timing with different link directions (hereinafter, referred to as a collided SF) for PCC and SCC are present due to different TDD CA configurations, only a CC having a specific link direction of PCC/SCC or the link direction of a specific CC (e.g., a PCC) may be used at the corresponding SF timing according to a hardware configuration of a UE or other reasons/purposes. For convenience, this scheme is referred to as half-duplex (HD)-TDD CA. For example, when a specific SF timing is configured as a DL SF on PCC and the corresponding SF timing is configured as a UL SF on SCC to form a collided SF, only PCC (i.e., a DL SF configured for the PCC) having a DL direction may be used and SCC (i.e., a UL SF configured for the SCC) having a UL direction may not be used at the specific SF timing (or vice versa). In this situation, as a considered method, in order to transmit A/N feedback of DL data transmitted through DL SFs of all CCs through a PCC, the same or different A/N timings (configured for a specific UL-DL configuration) may be applied per CC or A/N timing configured for a specific UL-DL configuration may be commonly applied to all CCs. Here, the specific UL-DL configuration (hereinafter, referred to as a reference configuration (Ref-Cfg)) may be determined to be the same as that of PCC or SCC, or may be determined to be another UL-DL configuration.

In case of HD-TDD CA, the number of DL SFs corresponding to A/N feedback (hereinafter, A/N-DL SF) at one UL SF timing may be differently configured for PCC and SCC. In other words, when the number of DL SFs (for convenience, A/N-DL SFs) corresponding to one UL SF is defined as M, M corresponding to one PCC UL SF may be differently/independently configured per CC (M per CC: Mc). In addition, when Ref-Cfg of a specific XCC (e.g., PCC or SCC) is not the same as a UL-DL configuration of PCC (i.e., PCC-Cfg), an A/N-DL SF index of the XCC configured for the PCC UL SF timing may be different from an A/N-DL SF index configured when A/N timing of the original PCC-Cfg is applied. In particular, in this case, if PUCCH resource linked to CCE resource of a PDCCH scheduling DL data is referred to as an implicit PUCCH, the implicit PUCCH (for a PCC UL SF for transmitting A/N with respect to the specific XCC DL SF) may not be defined for the specific XCC DL SF despite the cross-CC scheduling situation.

Figure 11:
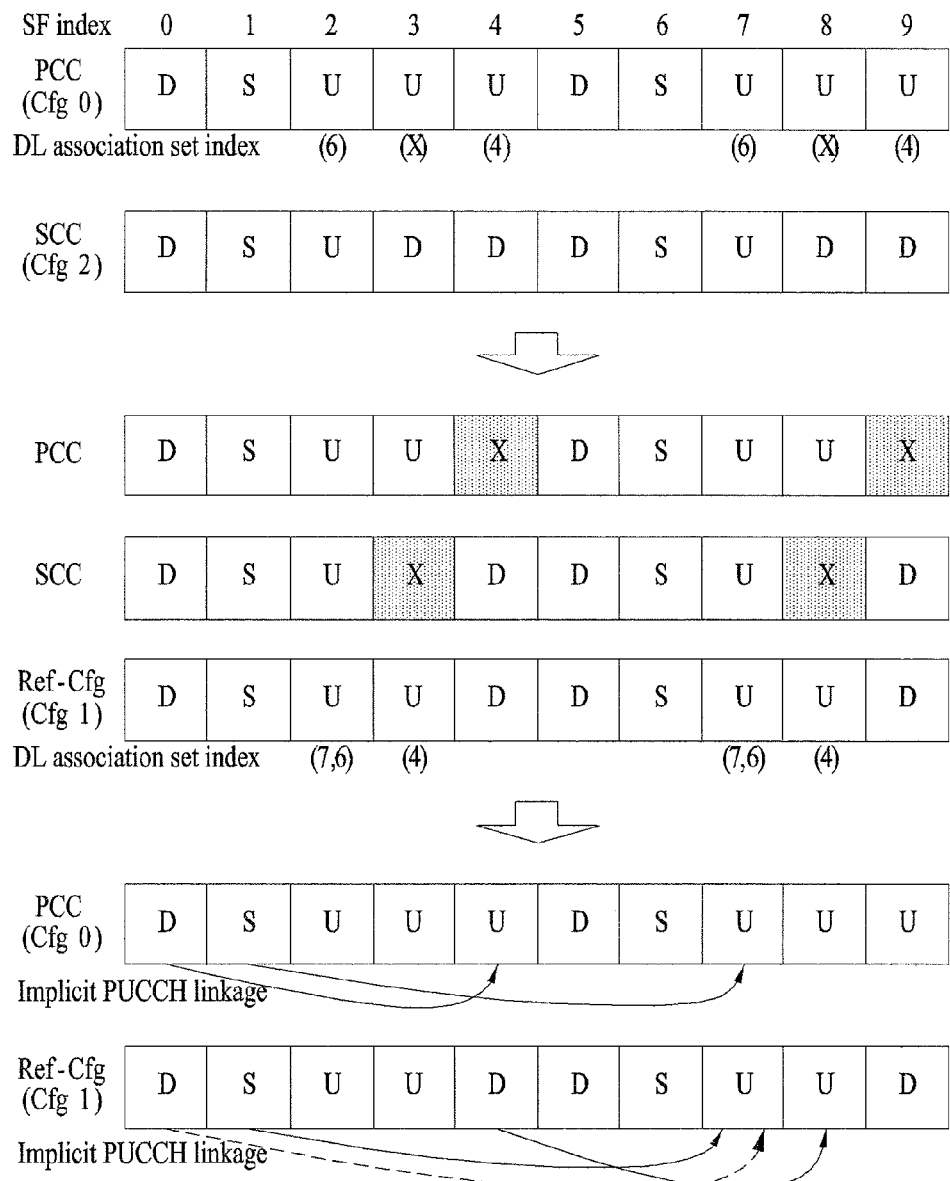
FIG. 11 illustrates an exemplary half duplex (HD)-TDD CA configuration.

FIG. 11 illustrates an exemplary HD-TDD CA configuration. In FIG. 11, a shaded gray (X) indicates a CC (link direction) which is restricted for use in a collided SF, and a dotted arrow indicates a DL SF to which an implicit PUCCH is not linked for a PCC UL SF.

Figure 12:
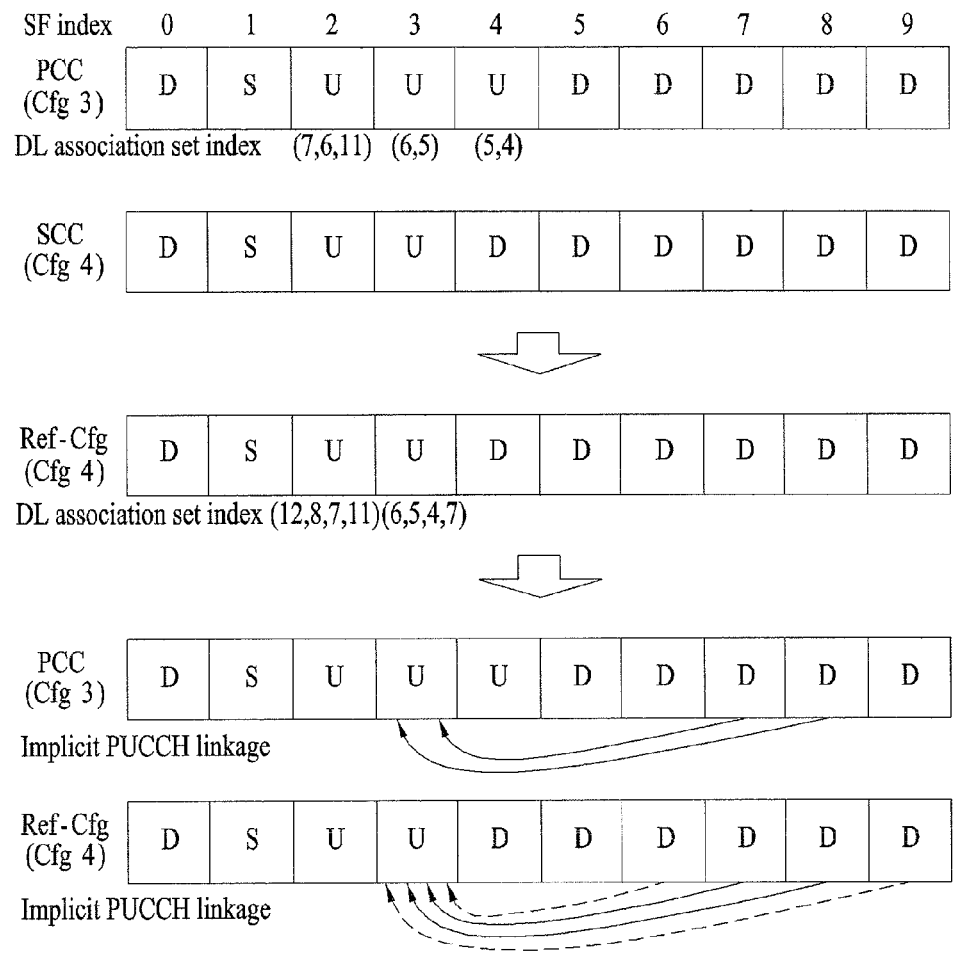

Meanwhile, it may be considered allowing UL/DL simultaneous transmission and reception in a collided SF with different link directions for PCC and SCC. For convenience, this scheme is referred to as full-duplex (FD)-TDD CA. Also in this case, in order to transmit A/N feedback for DL SFs of all CCs in one PCC UL SF, the same or different A/N timings (configured according to Ref-Cfg) may be applied per CC or A/N timing configured according to a specific Ref-Cfg may be commonly applied to all CCs. The Ref-Cfg may be the same as PCC-Cfg or SCC-Cfg or may be given as another different UL-DL Cfg. Additionally, in the FD-TDD CA configuration, M may be differently/independently configured per CC with respect to one PCC UL SF and the implicit PUCCH may not be defined for the specific XCC DL SF (in a PCC UL SF corresponding to the specific XCC DL SF) despite the cross-CC scheduling situation. FIG. 12 illustrates an exemplary FD-TDD CA configuration. Here, a dotted arrow indicates a DL SF to which the implicit PUCCH resource is not linked for a PCC UL SF.

As described above, due to introduction of various TDD CA situations (e.g., aggregation of CCs with different UL-DL configurations, HD-TDD CA, FD-TDD CA, etc.) and/or definition of Ref-Cfg according thereto, the number of DL subframes corresponding to UL subframes for transmitting A/N (hereinafter, referred to as an A/N subframe) may be changed according to a CC (or a cell). Thus, in this case, there is a need for a method for transmitting A/N. Hereinafter, for example, a method for effectively transmitting A/N according to an A/N transmission mode (e.g., a channel selection mode or a PUCCH format 3 mode) when CCs (or cells) with different UL-DL configurations are aggregated will be described below.

Embodiment 1

A/N Transmission Through PUSCH in Channel Selection Mode

In the present embodiment, a UE is set in channel selection mode and a plurality of CCs (or cells) with different UL-DL configurations are aggregated. With regard to this case, A/N transmission through a PUSCH will be described below. Here, the channel selection mode may refer to channel selection using PUCCH format 1b.

Prior to description of the present invention, A/N transmission in a channel selection mode of TDD CA of conventional LTE-A will be described with reference to FIGS. 13A and 13B.

As illustrated in FIG. 13A, conventional LTE-A assumes a case in which two serving cells (i.e., PCell and SCell) (or a PCC and an SCC) having the same TDD UL-DL Cfg are aggregated. First, a channel selection scheme using PUCCH format 1b for M≤2 in a UL subframe n for HARQ-ACK transmission will be described. Here, M is the number (i.e., the number of DL SFs corresponding to UL SFs) of elements of set K described with reference to Table 4 above. In the case of M≤2 in UL subframe n, b(0)b(1) may be transmitted on a PUCCH resource selected from A PUCCH resources ($n^{(1)}_{PUCCH,i}$) (0≤i≤A−1 and A ⊂ {2,3,4}). In detail, the UE transmits an A/N signal in UL subframe n using PUCCH format 1b according to Tables 7 to 9 below. In the case of M=1 in UL subframe n, HARQ-ACK(j) refers to an A/N response to a transport block or an SPS release PDCCH, associated with serving cell c. Here, in the case of M=1, a transport block, HARQ-ACK(j), and A PUCCH resources may be given according to Table 10 below. In the case of M=2 in a UL subframe, HARQ-ACK(j) refers to an A/N response to a transport block or an SPS release PDCCH in a DL subframe(s) given by set K in each serving cell. Here, in the case of M=2, subframes on each serving cell for HARQ-ACK(j) and A PUCCH resources may be given according to Table 11 below.

Table 7 below shows an exemplary mapping table for channel selection defined in an LTE-A system when two CCs having the same UL-DL Cfg are aggregated, M=1, and A=2.

TABLE 7

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

In Table 7, an implicit PUCCH resource linked to a PDCCH (i.e., a PCC-PDCCH) for scheduling a PCC (or a PCell) may be allocated to $n^{(1)}_{PUCCH,0}$ and an implicit PUCCH resource linked to a PDCCH (i.e., an SCC-PDCCH) for scheduling an SCC or an explicit PUCCH resource reserved via RRC may be allocated to $n^{(1)}_{PUCCH,1}$ according to whether cross CC scheduling is performed. For example, in the cross-CC scheduling situation, an implicit PUCCH resource linked to a PCC-PDCCH may be allocated to $n^{(1)}_{PUCCH,0}$ and an implicit PUCCH linked to an SCC-PDCCH may be allocated to $n^{(1)}_{PUCCH,1}$.

Table 8 below shows an exemplary mapping table for channel selection defined in an LTE-A system when two CCs having the same UL-DL Cfg are aggregated, M=1, and A=3.

TABLE 8

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |

TABLE 8-continued

| HARQ-ACK(0), HARQ-ACK(1), HARQ-ACK(2) | $n_{PUCCH}^{(1)}$ | b(0)b(1) |
|---|---|---|
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

Here, when a PCC is a MIMO CC and an SCC is a non-MIMO CC, an implicit PUCCH resource linked to a PCC-PDCCH may be allocated to $n^{(1)}_{PUCCH,0}$ and $n^{(1)}_{PUCCH,1}$, and an implicit PUCCH resource linked to an SCC-PDCCH or an explicit PUCCH resource reserved via RRC may be allocated to $n^{(1)}_{PUCCH,2}$ according to whether cross CC scheduling is performed. In addition, when the PCC is a non-MIMO CC and the SCC is a MIMO CC, an implicit PUCCH resource linked to a PCC-PDCCH may be allocated to $n^{(1)}_{PUCCH,0}$, and an implicit PUCCH resource linked to an SCC-PDCCH or an explicit PUCCH resource reserved via RRC may be allocated to $n^{(1)}_{PUCCH,1}$ and $n^{(1)}_{PUCCH,2}$ according to whether cross-CC scheduling is performed.

Table 9 below shows an exemplary mapping table for channel selection defined in an LTE-A system when two CCs having the same UL-DL Cfg are aggregated, M≤2, and A=4.

TABLE 9

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Here, an implicit PUCCH resource linked to a PDCCH (i.e., a PCC-PDCCH) for scheduling a PCC (or a PCell) may be allocated to $n^{(1)}_{PUCCH,0}$ and/or $n^{(1)}_{PUCCH,1}$ irrespective of cross-CC scheduling, and an implicit PUCCH resource linked to a PDCCH (i.e., an SCC-PDCCH) for scheduling an SCC or an explicit PUCCH resource reserved via RRC may be allocated to $n^{(1)}_{PUCCH,2}$ and/or $n^{(1)}_{PUCCH,3}$ according to whether cross-CC scheduling is performed. For example, in the cross-CC scheduling situation, in the case of M=2, implicit PUCCH resources linked to PCC-PDCCHs of a first DL SF and a second DL SF may be allocated to $n^{(1)}_{PUCCH,0}$ and $n^{(1)}_{PUCCH,1}$, respectively, and implicit PUCCH resources linked to SCC-PDCCHs of a first DL SF and a second DL SF may be allocated to $n^{(1)}_{PUCCH,2}$ and $n^{(1)}_{PUCCH,3}$, respectively.

Table 10 below shows an exemplary transport block, HARQ-ACK(j), and PUCCH resource in the case of M=1.

TABLE 10

| | HARQ-ACK(j) | | | |
|---|---|---|---|---|
| A | HARQ-ACK (0) | HARQ-ACK (1) | HARQ-ACK( 2) | HARQ-ACK (3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block, NA: not available

Table 11 below shows an exemplary transport block, HARQ-ACK(j), and PUCCH resource in the case of M=2.

TABLE 11

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

Next, in the case of M>2, a channel selection scheme using PUCCH format 1b in UL subframe n for transmitting HARQ-ACK transmission will be described. The current channel selection scheme is basically the same/similar as in the case of M≤2. In detail, the UE transmits an A/N signal using PUCCH format 1b in a UL subframe n according to Tables 12 and 13. In the case of M>2 in UL subframe n, $n^{(1)}_{PUCCH,0}$ and $n^{(1)}_{PUCCH,1}$ are associated with DL transmission(s) (e.g., PDSCH transmission(s)) on a PCell and $n^{(1)}_{PUCCH,2}$ and $n^{(1)}_{PUCCH,3}$ are associated with DL transmission (s) (e.g., PDSCH transmission(s)) on an SCell.

In addition, HARQ-ACK(i) for a random cell refers to an A/N response to a PDCCH (a PDSCH corresponding thereto) with i+1 as DAI-c for scheduling the corresponding cell. When a PDSCH w/o PDCCH is present, HARQ-ACK (0) may refer to an A/N response to the corresponding PDSCH w/o PDCCH and HARQ-ACK(i) may refer to an A/N response to a PDCCH (a PDSCH corresponding thereto) with i as DAI-c.

Table 12 below shows an exemplary mapping table for channel selection defined in an LTE-A system when two CCs having the same UL-DL Cfg are aggregated and M=3.

TABLE 12

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH, 1}^{(1)}$ | 1, 1 | 1, 1, 1, 1 |
| ACK, ACK, NACK/DTX | ACK, ACK, ACK | $n_{PUCCH, 1}^{(1)}$ | 0, 0 | 1, 0, 1, 1 |
| ACK, NACK/DTX, any | ACK, ACK, ACK | $n_{PUCCH, 3}^{(1)}$ | 1, 1 | 0, 1, 1, 1 |
| NACK/DTX, any, any | ACK, ACK, ACK | $n_{PUCCH, 3}^{(1)}$ | 0, 1 | 0, 0, 1, 1 |
| ACK, ACK, ACK | ACK, ACK, NACK/DTX | $n_{PUCCH, 0}^{(1)}$ | 1, 0 | 1, 1, 1, 0 |
| ACK, ACK, NACK/DTX | ACK, ACK, NACK/DTX | $n_{PUCCH, 3}^{(1)}$ | 1, 0 | 1, 0, 1, 0 |
| ACK, NACK/DTX, any | ACK, ACK, NACK/DTX | $n_{PUCCH, 0}^{(1)}$ | 0, 1 | 0, 1, 1, 0 |
| NACK/DTX, any, any | ACK, ACK, NACK/DTX | $n_{PUCCH, 3}^{(1)}$ | 0, 0 | 0, 0, 1, 0 |
| ACK, ACK, ACK | ACK, NACK/DTX, any | $n_{PUCCH, 2}^{(1)}$ | 1, 1 | 1, 1, 0, 1 |
| ACK, ACK, NACK/DTX | ACK, NACK/DTX, any | $n_{PUCCH, 2}^{(1)}$ | 0, 1 | 1, 0, 0, 1 |
| ACK, NACK/DTX, any | ACK, NACK/DTX, any | $n_{PUCCH, 2}^{(1)}$ | 1, 0 | 0, 1, 0, 1 |
| NACK/DTX, any, any | ACK, NACK/DTX, any | $n_{PUCCH, 2}^{(1)}$ | 0, 0 | 0, 0, 0, 1 |
| ACK, ACK, ACK ACK, ACK, NACK/DTX | NACK/DTX, any, any | $n_{PUCCH, 1}^{(1)}$ | 1, 0 | 1, 1, 0, 0 |
| | NACK/DTX, any, any | $n_{PUCCH, 1}^{(1)}$ | 0, 1 | 1, 0, 0, 0 |
| ACK, NACK/DTX, any | NACK/DTX, any, any | $n_{PUCCH, 0}^{(1)}$ | 1, 1 | 0, 1, 0, 0 |
| NACK, any, any | NACK/DTX, any, any | $n_{PUCCH, 0}^{(1)}$ | 0, 0 | 0, 0, 0, 0 |
| DTX, any, any | NACK/DTX, any, any | No Transmission | | 0, 0, 0 ,0 |

Here, an implicit PUCCH resource linked to a PDCCH (i.e., a PCC-PDCCH) for scheduling a PCC (or a PCell) may be allocated to $n^{(1)}_{PUCCH,0}$ and/or $n^{(1)}_{PUCCH,1}$ irrespective of cross-CC scheduling, and an implicit PUCCH resource or an explicit PUCCH resource reserved via RRC may be allocated to $n^{(1)}_{PUCCH,2}$ and/or $n^{(1)}_{PUCCH,3}$ according to whether cross-CC scheduling is performed. For example, in a TDD situation, an implicit PUCCH resource linked to a PCC-PDCCH with 1 as DAI-c may be allocated to $n^{(1)}_{PUCCH,0}$ and $n^{(1)}_{PUCCH,1}$, and an implicit PUCCH resource linked to a SCC-PDCCH with 1 as DAI-c may be allocated to $n^{(1)}_{PUCCH,2}$ and $n^{(1)}_{PUCCH,3}$.

Table 13 below shows an exemplary mapping table for channel selection defined in an LTE-A system when two CCs having the same UL-DL Cfg are aggregated and M=4.

TABLE 13

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |

TABLE 13-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n_{PUCCH,0}^{(1)}$, $n_{PUCCH,1}^{(1)}$, $n_{PUCCH,2}^{(1)}$, and $n_{PUCCH,3}^{(1)}$ may be allocated as shown in Table 13 above.

Figure 13B:
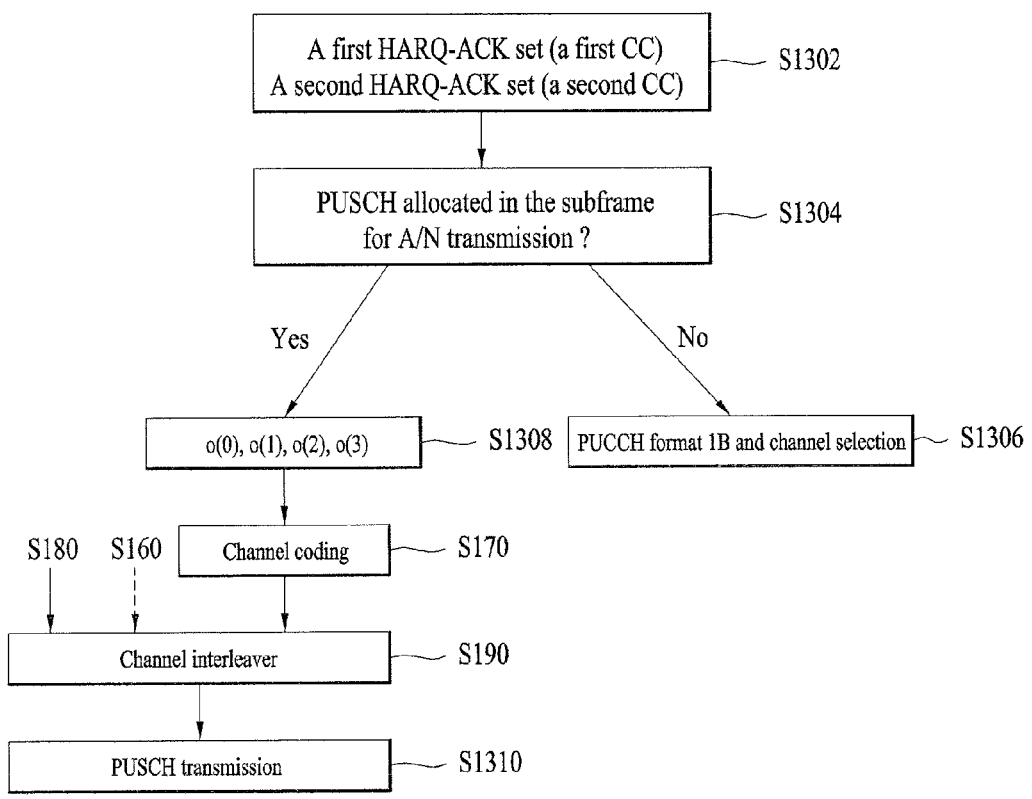

FIG. 13B illustrates an A/N transmission procedure based on channel selection in TDD CA according to a conventional method. Conventionally, when a channel selection mode is set, TDD CA assumes a case in which two CCs having the same UL-DL configuration (e.g., a PCC and an SCC) are aggregated (FIG. 13A).

Referring to FIG. 13B, a UE generates a first set of HARQ-ACK for a first CC (or cell) and a second set of HARQ-ACK for a second CC (or cell) (S1302). Then, the UE checks whether PUSCH allocation is present in a subframe for A/N transmission (hereinafter, referred to as A/N subframe) (S1304). When the PUSCH allocation is not present in the A/N subframe, the UE performs channel selection using PUCCH format 1b to transmit A/N information (refer to Tables 7 to 13). On the other hand, when the PUSCH allocation is present in the A/N subframe, the UE multiplexes an A/N bit to the PUSCH. In detail, the UE generates an A/N bit sequence (e.g., o(0),o(1),o(2), and o(3) of Tables 12 and 13) corresponding to the first set of HARQ-ACK and the second set of HARQ-ACK (S1308). The A/N bit sequence is transmitted through a PUSCH via channel coding (S170 of FIG. 5) and a channel interleaver (S190 of FIG. 5). The channel coding includes Reed-Muller (RM) coding, tail-biting convolutional coding, etc.

In FIG. 13B, A/N transmission through a PUSCH may be performed with reference to UL DAI (briefly, W) in a UL grant PDCCH for scheduling the corresponding PUSCH. For convenience of description, M=4 is assumed in an A/N subframe. In this case, channel selection mapping (Table 13) based on fixed M ((=4) is used for A/N transmission through a PUCCH. However, channel selection mapping based on W(≤M) in a UL grant PDCCH is used for A/N transmission through a PUSCH (e.g., W=3: Table 12 and W=2: Table 9). In other words, when A/N is piggybacked on the PUSCH, the UE replaces M with W and transmits A/N using channel selection mapping based on W. A detailed description thereof may be summarized below according to W.

Hereinafter, a CA situation of two CCs (i.e., a PCC and an SCC) is assumed. In addition, the numbers of A/N-DL SFs of a CC1 (e.g., a PCC) (or an SCC) and a CC2 (e.g., an SCC) (or a PCC) configured in PCC UL SF n (refer to the number elements of set K, Table 4) are defined as M1 and M2, respectively. Here, M1 and M2 may be differently configured according to application of different TDD UL-DL configurations and/or Ref-Cfgs. In addition, hereinafter, A refers to ACK, N refers to NACK, and D refers to no reception of data or no reception of a PDCCH (i.e., DTX). N/D refers to NACK or DTX and 'any' refers to ACK, NACK, or DTX. In addition, the maximum number of transport blocks (TBs) that can be transmitted through a CC is referred to as Ntb for convenience. In addition, DL data (e.g., a PDSCH transmitted through an SPS) transmitted without a PDCCH is referred to as a DL data w/o PDCCH for convenience. DL data may collectively indicate PDCCH/PDSCH requiring ACK/NACK feedback and may include a PDCCH requesting SPS release. In addition, a DL SF may include a special SF as well as a general DL SF.

Hereinafter, W is a value indicated by a UL DAI field in a UL grant PDCCH and V is a value indicated by a DL DAI field in a DL grant PDCCH.

when W=1 (scheme 1)
when both a PCC and an SCC have Ntb=1
  HARQ-ACK(0) is an A/N response to PCC DL data corresponding to a PDCCH with V=1 or an A/N response to a DL data w/o PDCCH
  HARQ-ACK(1) is an A/N response to SCC DL data corresponding to PDCCH with V=1
When a PCC has Ntb=2 and an SCC has Ntb=1
  each of HARQ-ACK(0) and (1) is an individual A/N response to each TB of PCC DL data corresponding to a PDCCH with V=1 or an A/N response to DL data w/o PDCCH (in this case, an A/N response to DL data w/o PDCCH may be mapped to HARQ-ACK(0) and HARQ-ACK(1) may be mapped to D)
  HARQ-ACK(2) is A/N response to SCC DL data corresponding to a PDCCH with V=1
when a PCC has Ntb=1 and an SCC has Ntb=2
  HARQ-ACK(0) is an A/N response to PCC response to PCC DL corresponding to a PDCCH with V=1 or an A/N response to a DL data w/o PDCCH
  each of HARQ-ACK(1) and (2) is an individual A/N response to each TB of SCC DL data corresponding to a PDCCH with V=1
when both a PCC and an SCC have Ntb=2
  each of HARQ-ACK(0) and (1) is an individual A/N response to each TB of PCC DL data corresponding to a PDCCH with V=1 or an A/N response to a DL data w/o PDCCH (in this case, an A/N response to a DL data w/o PDCCH may be mapped to HARQ-ACK(0) and HARQ-ACK(1) may be mapped to D)
  each of HARQ-ACK(2) and (3) is an individual A/N response to each TB of SCC DL data corresponding to a PDCCH with V=1
HARQ-ACK(i) is determined in a final RM code input bit o(i) for A/N piggybacking on a PUSCH (via A→1 and N/D→0 mapping procedures).
when W=2 (scheme 2)
  HARQ-ACK(0) and (1) are A/N responses to PCC DL data corresponding to PDCCHs with V=1 and 2, respectively. When a DL data w/o PDCCH is present, HARQ-ACK(1) may be an A/N response to DL data w/o PDCCH.
  HARQ-ACK(2) and (3) are A/N response to SCC DL data corresponding to PDCCHs with V=1 and 2, respectively.
  HARQ-ACK(i) is determined in a final RM code input bit o(i) for A/N piggybacking to a PUSCH (via A→1 and N/D→0 mapping procedure).
When W=3 (scheme 3)
  PCC HARQ-ACK(0), (1), and (2) are A/N responses to PCC DL data corresponding to PDCCHs with V=1, 2, and 3, respectively. When a DL data w/o PDCCH is present, HARQ-ACK(0) may be an A/N response to DL data w/o PDCCH and HARQ-ACK(1) and (2) may be A/N responses to PCC DL data corresponding to PDCCHs with V=1 and 2, respectively.
  SCC HARQ-ACK(0), (1), and (2) are A/N responses to SCC DL data corresponding to PDCCHs with V=1, 2, and 3, respectively.
  A/N piggybacking to a PUSCH is performed using RM code input bits o(0), o(1), o(2), and o(3) corresponding to all corresponding A/N states (PCC HARQ-ACK(0), (1), and (2), and SCC HARQ-ACK(0), (1), and (2)) in Table 12 above.

When W=4 (scheme 4)
  PCC HARQ-ACK(0), (1), (2), and (3) are A/N responses to PCC DL data corresponding to PDCCHs with V=1, 2, 3, and 4, respectively. When a DL data w/o PDCCH is present, HARQ-ACK(0) may be an A/N response to DL data w/o PDCCH, and HARQ-ACK(1), (2), and (3) may be A/N responses to PCC DL data corresponding to PDCCHs with V=1, 2, and 3, respectively.
  SCC HARQ-ACK(0), (1), (2), and (3) are A/N responses to SCC DL data corresponding to PDCCHs with V=1, 2, 3, and 4, respectively.
  A/N piggybacking on a PUSCH is performed using RM code input bits o(0), o(1), o(2), and o(3) corresponding to all corresponding A/N states (PCC HARQ-ACK(0), (1), (2), and (3), and SCC HARQ-ACK(0), (1), (2), and (3)) in Table 13 above.

To aid in understanding, a detailed operation given M=4 will be described below. When A/N transmission is performed through a PUCCH, PCC HARQ-ACK(0), (1), (2), (3)=(A, A, N/D, any), and SCC HARQ-ACK(0), (1), (2), (3)=(N/D, any, any, any), the UE performs A/N transmission using a combination (i.e., (n(1)PUCCH,1, and b(0)b(1)=0, 1)) of a QPSK symbol and PUCCH resource corresponding to the corresponding A/N state in Table 13 above. When A/N piggybacking on a PUSCH is performed, W=3 (scheme 3), PCC HARQ-ACK(0), (1), (2)=(A, A, A), and SCC HARQ-ACK(0), (1), (2)=(A, N/D, any), the UE performs A/N transmission using 4-bit RM code input bits o(0),o(1),o(2), o(3)=(1,1,0,1) corresponding to corresponding A/N states in Table 12 above.

When W=2 (scheme 2), PCC HARQ-ACK(0), (1)=(A, N/D), and SCC HARQ-ACK(2), (3)=(N/D, A), the UE performs A/N transmission using 4-bit RM code input bits corresponding to A/N states (A, N/D, N/D, A). In the case of W=2, an A/N state is mapped directly to an RM code input bit (e.g., A→1, N/D→0). Thus, the UE performs A/N transmission on a PUSCH using o(0),o(1),o(2),o(3)=(1,0,0, 1).

As another example, it is assumed that a PCC has Ntb=2 and an SCC has Ntb=1. When A/N is piggybacked on the PUSCH and W=1 (scheme 1), if PCC HARQ-ACK(0), (1)=(N/D, A) and SCC HARQ-ACK(2)=(A), the UE performs A/N transmission using 3-bit RM code input bits corresponding to A/N states (N/D, A, A). When W=1, an A/N state is mapped directly to an RM code input bit (e.g., A→1, N/D→0). Thus, the UE performs A/N transmission on a PUSCH using o(0),o(1),o(2)=(0,1,1).

Hereinafter, an appropriate A/N state mapping method during A/N transmission when a plurality of CCs having different TDD DL-UL configurations are aggregated and a channel selection mode is set for A/N transmission (through a PUCCH) will be described. For convenience of description, according to the present embodiment, a CA situation of two CCs (e.g., a PCC and an SCC) is assumed. In addition, the numbers of A/N-DL SFs of a CC1 (e.g., a PCC) (or an SCC) and a CC2 (e.g., an SCC) (or a PCC) configured at PCC UL SF timing based on the Ref-Cfg are defined as M1 and M2, respectively. Here, M1 and M2 may be differently configured according to application of different TDD UL-DL Cfgs and Ref-Cfgs. The present embodiment proposes A/N state mapping per CC and a method for determining an RM code input bit according to a combination of M1 and M2 (M1<M2) and W signaled through a UL grant PDCCH. Here, RM is an example of channel coding and may be replaced with other known channel coding methods.

when W≤M1
  A/N piggybacking may be performed on both a CC1 and a CC2 using channel selection mapping based on W.

For example, when M1=3, M2=4, and W=2, the UE may map an A/N state to both CCs based on W=2 and determine an RM code input bit corresponding to the A/N state (scheme 2). The RM input bit is transmitted through a PUSCH via channel coding, etc.

When M1<W≤M2

Channel selection mapping based on M1 may be used for a CC1 and A/N piggyback may be performed on a CC2 using channel selection mapping based on W.

For example, when M1=2, M2=4, and W=3, the UE may map CC1 A/N state to a CC1 based on M1=2 and determine a CC1 RM code input bit corresponding to the A/N state (scheme The UE may map a CC2 A/N state to CC2 based on W=3 and determine a CC2 RM code input bit corresponding to CC2 A/N state (scheme 3).

The UE may concatenate CC1 RM code input bit and CC2 RM code input bit (e.g., PCC first and SCC last) to generate a final RM code input bit about an overall A/N state. The final RM input bit is transmitted through a PUSCH via channel coding, etc.

To aid in understanding, a detailed operation when M1=2, M2=4, CC1=PCC, CC2=SCC, and A/N is piggybacked on a PUSCH using a channel selection scheme will be described. First, when W=2 (i.e., W≤M1), scheme 2 may be applied to both the two CCs. In detail, when it is assumed that an A/N response to a PCC satisfies HARQ-ACK(0), (1)=(A, A) and an A/N response to an SCC satisfies HARQ-ACK(2), (3)=(A, N/D), A/N transmission may be performed using 4-bit RM code input bits corresponding to A/N states (A, A, A, N/D). When W=2, an A/N state is mapped directly to an RM code input bit (e.g., A→1, N/D→0), and thus, the UE may perform A/N transmission on a PUSCH using o(0),o(1),o(2),o(3)=(1,1,1,0). Then, when W=3 (i.e., M1<W≤M2), a channel selection scheme based on M1=2 is applied to the PCC (scheme 2) and a channel selection scheme based on W=3 is applied to the SCC (scheme 3). When it is assumed that an A/N response to a PCC satisfies HARQ-ACK(0) and (1)=(N/D, A), 2-bit RM code input bits o(0),o(1)=(0,1) corresponding to A/N states (N/D, A) of the PCC may be determined (by mapping A and N/D to bits 1 and 0, respectively). Then, when it is assumed that an A/N response to an SCC satisfies SCC HARQ-ACK(0), (1), (2)=(A, A, N/D), 2-bit RM code input bits o(2),o(3)=(1,0) corresponding to A/N states of the SCC in Table 12 above may be determined. Lastly, the UE may concatenate the PCC RM code input bit and the SCC RM code input bit (e.g., PCC first and SCC last) to generate final RM code input bits o(0),o(1),o(2),o(3)=(0,1,1,0) of an overall A/N state. The final RM input bit is transmitted through a PUSCH via channel coding, etc.

In short, according to the above proposed schemes, as to A/N state mapping per CC, a channel selection mapping scheme based on min (M1, W) may be used for CC1 and a channel selection mapping scheme based on min (M2, W) may be used for CC2 (refer to schemes 1 to 4). In detail, based on min (M1, W) and min (M2, W), A/N state HARQ-ACK(i) per CC may be determined and the final RM code input bit (about an overall A/N state) obtained by concatenating RM code input bits (per CC) corresponding to the A/N state HARQ-ACK(i). The final RM input bit is transmitted through a PUSCH via channel coding, etc. (A/N piggybacking). This method is referred to as Alt 1 for convenience. Preferably, this method can be applied to the case of W=1 or 2. Alternatively, the proposed method can be applied to only the case of min (M, W)=1 or 2. In the other cases, that is, in the case of W=3 or 4, according to a conventional LTE-A method, channel selection mapping based on W may be performed on both CC1 and CC2 to generate RM code input bits. That is, in the case of W=3 or 4, the aforementioned method and channel selection mapping based on W may be used for all CCs irrespective of whether large or small between W and M (of each CC) to determine A/N state HARQ-ACK(i) per CC and to generate a final RM code input bit (about an overall A/N state) obtained by concatenating RM code input bits (per CC) corresponding to the A/N state HARQ-ACK(i). When the method is applied to only the case of W=1 or 2, spatial bundling may be applied to only a CC with min (M, W)=2 and may not be applied to a CC with min (M, W)=1.

Figure 14:
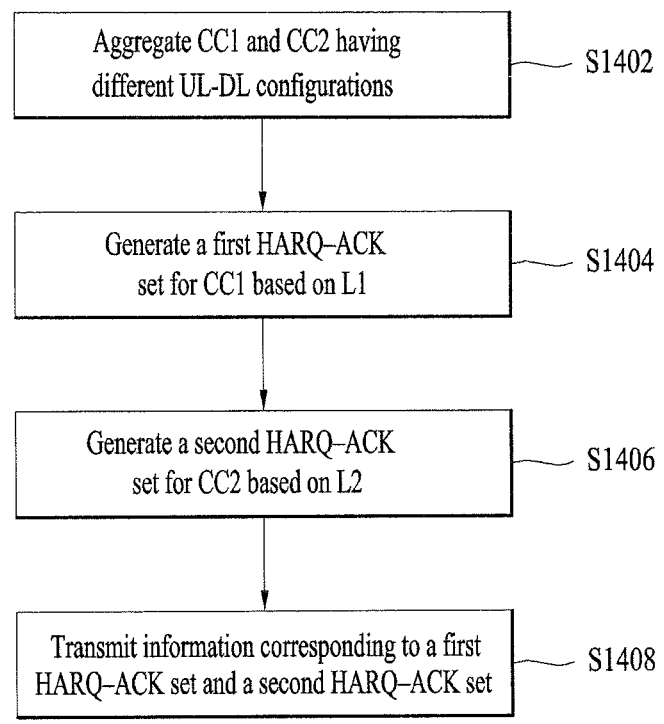
FIG. 14 illustrates exemplary TDD CA A/N transmission according to an embodiment of the present invention.

FIG. 14 illustrates exemplary A/N transmission according to an embodiment of the present invention. Although the A/N transmission will be described with reference to FIG. 14 as to a UE for convenience, it is obvious that a corresponding operation can be performed by a BS.

Referring to FIG. 14, the UE aggregates a plurality of CCs (e.g., CC1 and CC2) having different UL-DL configurations (refer to Table 1) (S1402). CC1 and CC2 may be a PCC and an SCC, respectively, but are not limited thereto. Then, upon receiving DL data (e.g., a PDSCH and an SPS release PDCCH), the UE performs a procedure for transmitting A/N feedback to the DL data. In detail, the UE may generate a first HARQ-ACK set based on L1 for CC1 (S1404) and generate a second HARQ-ACK set based on L2 for CC2 (S1406). Then, the UE may transmit information corresponding to the first HARQ-ACK set and the second HARQ-ACK set to the BS through a PUSCH (S1408). In this example, when a first condition is satisfied, L1=min (M1, W) and L2=min (M2, W). M1 indicates the number of DL SFs corresponding to A/N UL SFs (e.g., PCC UL SF n) for CC1. Similarly, M2 indicates the number of DL SFs corresponding to A/N UL SFs (e.g., PCC UL SF n) for CC2. On the other hand, when a second condition is satisfied, L1=L2=W. The first condition may include W=1 or 2 and the second condition may include W=3 or 4, but the present invention is not limited thereto.

In addition, when {min(M1, W), min(M2, W)} is {1, 2}, {1, 3}, or {1, 4}, spatial bundling may be applied to CC1 (that is, 1-bit and 2-bit may be generated for CC1 and CC2, respectively, irrespective of Ntb configured for CC1/CC2). In other words, the spatial bundling may not be applied to only the case in which {min(M1, W), min(M2, W)} is {1, 1} (or the case of W=1). On the other hand, in the other cases (or in the case of W=2, 3, and 4, preferably, W=2), the spatial bundling may be applied to a CC (for convenience, a MIMO CC) configured to transmit a plurality of transport blocks. The spatial bundling may refer to a process of bundling HARQ-ACK response(s) to DL data received in the same subframe of a corresponding CC as one HARQ-ACK response by logical operation (e.g., logical-AND operation).

In addition, when {min(M1, W), min(M2, W)} is {1, 3}, the spatial bundling may be applied to CC1, and spatial-bundled A/N responses corresponding to V=1, 2, and 3 (or V=1, 2, DL data w/o PDCCH, and in this case, an A/N response to a DL data w/o PDCCH may be arranged in an LSB) may be mapped to CC2. In this case, irrespective of Ntb configured for CC1/CC2, 1-bit and 3-bits may be generated for CC1 and CC2, respectively. In this case, A/N bit(s) generated per CC may also be concatenated (e.g., PCC first and SCC last) to generate a final A/N payload to be transmitted through a PUSCH.

In addition, in the case of {M1, M2}={1, 2}, {1, 3}, or {1, 4}, when W corresponding to an A/N PUSCH is not present (e.g., a PUSCH based on a SPS scheme), the same method may be applied. That is, an individual A/N response per TB may be generated for CC1 without spatial bundling, or spatial bundling may be applied to always allocate 1-bit irrespective of Ntb.

As another example, the aforementioned method and channel selection mapping based on W may be used for all CCs irrespective of whether large or small between W and M (of each CC) to determine A/N state HARQ-ACK(i) and to generate a final RM code input bit (about an overall A/N state) obtained by concatenating RM code input bits (per CC) corresponding to the A/N state HARQ-ACK(i). In this case, channel selection mapping for W A/N-DL SFs, the number of which is greater than a maximum of M A/N-DL SFs to be subjected to A/N feedback, is applied to CCs with W>M. In this case, when determining the A/N state HARQ-ACK(i) of the corresponding CC, an A/N response may be processed as DTX in response to DL data corresponding V (DL DAI) that exceeds M or DL data corresponding to an A/N-DL SF index that exceeds an M A/N-DL SF index. This is because the DL data is not actually present on the corresponding CC. This method is referred to as Alt 2 for convenience. Preferably, this method can be applied to the case of W=3 or 4.

In this example, when W=1 or 2, scheme Alt 1 may be used, and when W=3 or 4, scheme Alt 2 may be used.

According to the aforementioned methods, when M=0 with respect to a specific CC, an A/N state of the corresponding CC and a RM code input bit corresponding thereto may not be generated. As a result, A/N feedback to the corresponding CC may be excluded from, that is, may not be included in an A/N payload configuration to be transmitted on a PUSCH. For example, in the case of M1=0 for CC1, when Alt 1 or Alt 2 is used, channel selection mapping based on min (M2, W) (or W) may be applied to CC2 only. That is, only the A/N state HARQ-ACK(i) for CC2 may be determined, only the RM code input bit corresponding to the A/N state HARQ-ACK(i) may be generated, and A/N piggybacking on the PUSCH may be performed. In addition, when W corresponding to an A/N PUSCH in the case of M1=0 is not present (e.g., an SPS-based PUSCH), the same method may also be applied based on M2 for CC2.

In addition, when {min(M1, W), min(M2, W)} is {0, 2}, spatial bundling may not be applied to CC2. Thus, 2×Ntb-bit RM code input bits respectively corresponding to 2×Ntb of A/N response in total may be generated according to Ntb set for the corresponding CC2. In addition, when {min(M1,W), min(M2,W)} is {0, 3} or {0, 4}, 3- or 4-bit RM code input bits corresponding to HARQ-ACK(i) (i.e., individual A/N response to each DL data) to the corresponding CC2 may be generated without referring to Tables 12 and 13, in schemes 3 and 4 (e.g., A→1 and N/D→0). Here, the A/N responses may be arranged according to a DL DAI order (e.g., the A/N responses may be sequentially arranged from an A/N response to DL data corresponding to a low DL DAI value). In this case, an A/N response to DL data w/o PDCCH may be arranged in an LSB. When {M1, M2}={0, 2}, {0, 3} or {0, 4}, if W corresponding to an A/N PUSCH is not present (e.g., an SPS-based PUSCH), the same method can be applied based on M2 for CC2.

A special SF (S SF) (e.g., which corresponds to S SF configuration #0 in Table 2) having less than N (e.g., N=3) OFDM symbols may be allocated to a DwPTS period. In this case, when the corresponding S SF is configured in a PCC (i.e., a PCell), a PDCCH (which requires only 1-bit A/N feedback) requesting SPS release may be transmitted through the corresponding S SF. On the other hand, when the corresponding S SF is configured in an SCC (i.e., an SCell), any PDCCH/DL that requires A/N feedback may not be transmitted through the corresponding S SF. Thus, according to the proposed method, if the corresponding S SF (for convenience, referred to as a shortest S SF) having a small DwPTS period is configured in a PCell as in the example, A/N corresponding to the corresponding shortest S SF may always be allocated to 1-bit irrespective of Ntb configured for the corresponding PCell or the corresponding shortest S SF may be excluded from an A/N-DL SF for determination of M. In this case, the UE may consider that a PDCCH requesting SPS release is not transmitted through the corresponding S SF (thus, a PDCCH monitoring procedure (e.g., blind decoding) may be omitted in the PCell S SF). When the shortest S SF is configured in the SCell, the corresponding S SF may be excluded from the A/N-DL SF for determination of M. As another example, in the case of the PCell, Ntb-bit (e.g., M=1) based on an Ntb value configured in the corresponding PCell or 1-bit (e.g., M>1) using spatial bundling may also be allocated to A/N corresponding to the shortest S SF, and in the case of the S Cell, the shortest S SF may be excluded from the A/N-DL SF for determination of M. In addition, when W corresponding to the A/N PUSCH is not present (e.g., a SPS-based PUSCH) or A/N is transmitted through a PUCCH, the aforementioned M-based channel selection mapping (determination of A/N state HARQ-ACK(i) and generation of RM code input bit corresponding thereto) may be used.

In addition, as an assumed method, the shortest S SF considered in the PCell is not excluded from the A/N-DL SF and A/N corresponding to the corresponding S SF is always allocated to 1-bit irrespective of Ntb considered in the corresponding PCell. In this case, when the PCell is configured by Ntb=2, the following A/N bit allocation may be possible with regard to M and W. In this case, the corresponding A/N bit may be determined in an RM code input bit (without a separate A/N mapping procedure, that is, by mapping A and N/D directly in bits 1 and 0). For convenience, M for the PCell and the S Cell are defined as Mp and Ms, respectively. In addition, A/N bit numbers corresponding to the PCell and the S Cell are defined as Np and Ns, respectively. It is assumed that an A/N-DL SF configured with at least Mp includes the shortest S SF. In the case of Mp=1 and Ms>2, Np=1 may be determined irrespective of W and Ms.

1) when Mp=1 and Ms=0
   A. when W corresponding to a PUSCH (or a PUCCH) for transmitting A/N is not present
      i. Np=1 and Ns=0
   B. when W corresponding to the PUSCH for transmitting A/N is present
      i. W=1 (or W≥1): Np=1 and Ns=0
2) when Mp=1 and Ms=1
   A. when W corresponding to the PUSCH (or the PUCCH) for transmitting A/N is not present
      i. Np=1 and Ns=Ntb configured in SCell
   B. when W corresponding to the PUSCH for transmitting A/N is present
      i. W=1 (or W≥1):Np=1, Ns=Ntb configured in SCell
3) when Mp=1 and Ms=2
   A. when W corresponding to the PUSCH (or PUCCH) for transmitting A/N is not present
      i. Np=1 and Ns=2 (spatial bundling is applied)
   B. when W corresponding to the PUSCH for transmitting A/N is present
      i. W=1: Np=1, Ns=Ntb configured in SCell
      ii. W=2 (or W≥2): Np=1 and Ns=2 (spatial bundling is applied)
4) when Mp=2 and Ms=0 (option 1)
   A. W corresponding to the PUSCH (or PUCCH) for transmitting A/N is not present
      i. Np=2 (spatial bundling is applied) and Ns=0
   B. W corresponding to the PUSCH for transmitting A/N is present
      i. W=1: Np=2 and Ns=0
      ii. W=2 (or W≥2): Np=2 (spatial bundling is applied) and Ns=0
5) when Mp=2 and Ms=0 (option 2)
   A. when W corresponding to the PUSCH (or PUCCH) for transmitting A/N is not present
      i. Np=3 (1-bit for S SF and 2-bit for normal DL SF) and Ns=0
   B. when W corresponding to the PUSCH for transmitting A/N is present
      i. W=1: Np=2 and Ns=0
      ii. W=2 (or W≥2): Np=3 and Ns=0

6) when Mp=2, Ms=1, and Ntb=1 is configured for the SCell (option 1)
  A. when W corresponding to the PUSCH (or PUCCH) for transmitting A/N is not present
    i. Np=2 (spatial bundling is applied) and Ns=1
  B. when W corresponding to the PUSCH for transmitting A/N is present
    i. W=1: Np=2 and Ns=1
    ii. W=2 (or W≥2): Np=2 (spatial bundling is applied) and Ns=1
7) when Mp=2, Ms=1, and Ntb=1 is configured for the SCell (option 2)
  A. when W corresponding to the PUSCH (or PUCCH) for transmitting A/N is not present
    i. Np=3 (1-bit for S SF and 2-bit for normal DL SF) and Ns=1
  B. when W corresponding to the PUSCH for transmitting A/N is present
    i. W=1: Np=2 and Ns=1
    ii. W=2 (or W≥2): Np=3 and Ns=1
8) when Mp=2, Ms=1, and Ntb=2 is configured for the SCell (option 1)
  A. when W corresponding to the PUSCH (or PUCCH) for transmitting A/N is not present
    i. Np=2 (spatial bundling is applied) and Ns=1 (spatial bundling is applied)
  B. when W corresponding to the PUSCH for transmitting A/N is present
    i. W=1: Np=2 and Ns=2
    ii. W=2 (or W≥2): Np=2 (spatial bundling is applied) and Ns=1 (spatial bundling is applied)
9) when Mp=2, Ms=1, and Ntb=2 is configured for the SCell (option 2)
  A. when W corresponding to the PUSCH (or PUCCH) for transmitting A/N is not present
    i. Np=2 (spatial bundling is applied) and Ns=2
  B. when W corresponding to the PUSCH for transmitting A/N is present
    i. W=1: Np=2 and Ns=2
    ii. W=2 (or W≥2): Np=2 (spatial bundling is applied) and Ns=2
10) when Mp=2 and Ms=2
  A. when W corresponding to the PUSCH (or PUCCH) for transmitting A/N is not present
    i. Np=2 (spatial bundling is applied) and Ns=2 (spatial bundling is applied)
  B. when W corresponding to the PUSCH for transmitting A/N is present
    i. W=1: Np=2 and Ns=Ntb configured for SCell
    ii. W=2 (or W≥2): Np=2 (spatial bundling is applied) and Ns=2 (spatial bundling is applied)

In addition, when Np=3 is allocated, the UE may have the following A/N bit configuration according to the number of TBs or DL data received through the PCell (for convenience of description, a PDCCH requesting SPS release is briefly referred to as "SPS release").

1) when only SPS release corresponding to V=1 is received
  A. 1-bit A/N to corresponding SPS release is arranged in MSB and 2-bit of the remaining LSB is processed as N/D
2) when only SPS release corresponding to V=2 is received
  A. 1-bit A/N to corresponding SPS release is arranged in LSB and 2-bit of the remaining MSB are processed as N/D
3) when only a PDSCH corresponding to V=1 is received
  A. 2-bit A/N (1-bit per TB) to the corresponding PDSCH is arranged in MSB and the remaining 1-bit (LSB) is processed as N/D
4) when only a PDSCH corresponding to V=2 is received
  A. 2-bit A/N (1-bit per TB) to the corresponding PDSCH is arranged in LSB and the remaining 1-bit (MSB) is processed as N/D
5) when both SPS release corresponding to V=1 and a PDSCH corresponding to V=2 are received
  A. 1-bit A/N to the corresponding SPS release is arranged in MSB and 2-bit A/N to the corresponding PDSCH is arranged in LSB
6) when both a PDSCH corresponding to V=1 and SPS release corresponding to V=2 are received
  A. 2-bit A/N to the corresponding PDSCH is arranged in MSB and 1-bit A/N to the corresponding SPS release is arranged in LSB Additionally, when the PCell and the SCell have the same TDD DL-UL Cfg, if the shortest S SF is configured, the proposed method may be applied using the above schemes (i.e., A/N corresponding to the corresponding S SF is always allocated to 1-bit or the corresponding S SF is excluded from the A/N-DL SF (during determination of M). In this case, in the method for excluding the shortest S SF (during determination of M) from the A/N-DL S, assuming that M when the shortest S SF is not excluded from the A/N-DL is M', M when the shortest S SF is excluded from the A/N-DL is M'−1. Here, in the case of a cell in which the shortest S SF is configured, with regard to a period including the corresponding S SF (A/N-DL SF included in the period), channel selection mapping (i.e., determination of A/N state HARQ-ACK(i) and generation of RM code input bit corresponding thereto) based on min(M, W)=min(M'−1, W), i.e., M'−1 in the case of W=M' (or W≥M') only. In addition, when W corresponding to the A/N PUSCH is not present, channel selection mapping based on M'−1 may be applied. In the other cases (i.e., W<M'), channel selection mapping based on W may be applied. Preferably, this method can be applied to the case in which M' is 1 or 2. In addition, M'−1=0, A/N corresponding thereto may not be configured (and may be allocated to 0-bit).

Embodiment 2

A/N Transmission Through PUSCH in PUCCH Format 3 Mode

According to the present embodiment, A/N transmission through a PUSCH when PUCCH format 3 mode is set and a plurality of CCs (or cells) having different UL-DL configurations is aggregated will be described below.

Prior to description of the present invention, A/N transmission in the PUCCH format 3 mode of TDD CA of conventional LTE-A will be described with reference to FIGS. 15 and 16.

Figure 15:
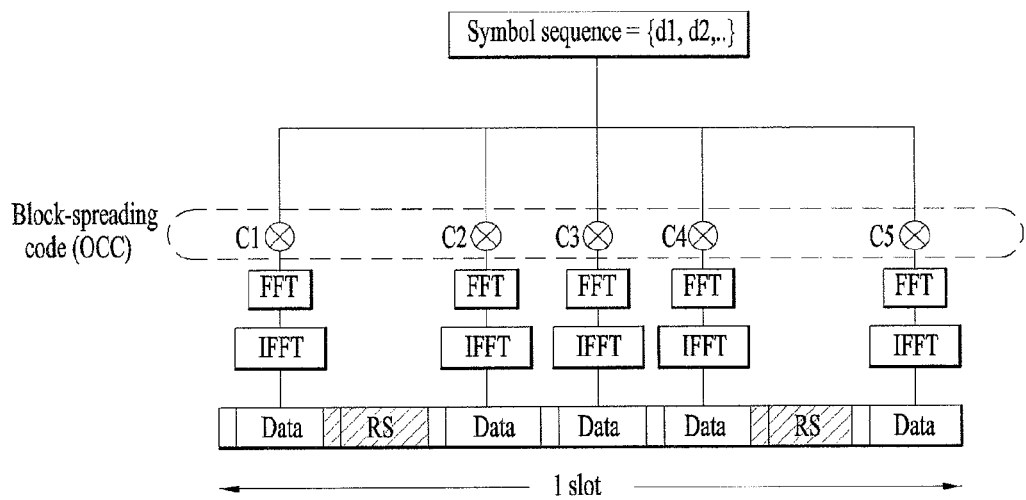
FIG. 15 illustrates PUCCH format 3 structure at a slot level.

FIG. 15 illustrates PUCCH format 3 structure at a slot level. In the PUCCH format 3, a plurality of A/N information is transmitted via joint coding (e.g., Reed-Muller code, tail-biting convolutional code, etc.), block spreading, and SC-FDMA modulation.

Referring to FIG. 15, one symbol sequence is transmitted over the frequency domain and time-domain spreading based on orthogonal cover code (OCC) is applied to the corresponding symbol sequence. Control signals of various UEs may be multiplexed with the same RB using the OCC. In detail, 5 SC-FDMA symbols (i.e., UCI data part) are generated from one symbol sequence ({d1,d2, . . . }) using a length-5 OCC (C1 to C5). Here, the symbol sequence ({d1,d2, . . . }) may refer to a modulation symbol sequence or a code bit sequence.

ACK/NACK payloads for PUCCH format 3 are configured per cell and are sequentially concatenated according to a cell index order. In detail, a HARQ-ACK feedback bit for c-th serving cell (or DL CC) is given as $$o^{ACK}_{c,0} o^{ACK}_{c,1}, \ldots, o^{ACK}_{c,O^{ACK}_c-1} (c \geq 0). \; O^{ACK}_c$$

is a bit number (i.e., size) of a HARQ-ACK payload for the c-th serving cell. When a transmission mode supporting single transport block transmission is configured or spatial bundling is applied to the c-th serving cell, $O^{ACK}_c=B^{DL}_c$ may be given. On the other hand, when a transmission mode supporting a plurality of (e.g., 2) transport blocks is configured or spatial bundling is not applied to the c-th serving cell, $O^{ACK}_c=2B^{DL}_c$ may be given. When a HARQ-ACK feedback bit is transmitted through PUCCH, or When a HARQ-ACK feedback bit is transmitted through PUSCH but W corresponding to the PUSCH is not present (e.g., an SPS-based PUSCH), BDLc=M is given. M is the number of elements of the set K as defined in Table 4 above. When TDD UL-DL configurations are #1, #2, #3, #4, and #6 and a HARQ-ACK feedback bit is transmitted through PUSCH, $B^{DL}_c=W^{UL}_{DAI}$. Here, $W^{UL}_{DAI}$ refers to a value indicated by a UL DAI field in a UL grant PDCCH and is briefly referred to as W. When a TDD UL-DL configuration is #5, $$B^{DL}_c = W^{UL}_{DAI} + 4\lceil (U - W^{UL}_{DAI})/4 \rceil.$$

Here, U is a maximum value among Ucs and Uc is the total number of PDSCH(s) received from a subframe n-k in the c-th serving cell and PDCCHs requesting (DL) SPS release. A subframe n is a subframe for transmitting a HARQ-ACK feedback bit. $\lceil\ \rceil$ is a ceiling functions.

When a transmission mode supporting single transport block transmission is configured or spatial bundling is applied to the c-th serving cell, a location of each ACK/NACK in a HARQ-ACK payload in the corresponding serving cell is given by $$o^{ACK}_{c,DAI(k)-1}.$$

DAI(k) refers to a DL DAI value of a detected PDCCH in a DL subframe n-k. On the other hand, when a transmission mode supporting a plurality of (e.g., 2) transport blocks is configured or spatial bundling is not applied to the c-th serving cell, a location of each ACK/NACK in a HARQ-ACK payload in the corresponding serving cell is given by $$o^{ACK}_{c,2DAI(k)-1}$$

and $$o^{ACK}_{c,2DAI(k)-2}.$$

$o^{ACK}_{c,2DAI(k)-1}$ indicates HARQ-ACK for codeword 0 and $o^{ACK}_{c,2DAI(k)-2}$ indicates HARQ-ACK for codeword 1. Codeword 0 and codeword 1 correspond to transport blocks 0 and 1 or transport blocks 1 and 0, respectively, according to swapping. When the PUCCH format 3 is transmitted in a subframe configured for SR transmission, the PUCCH format 3 is transmitted together with ACK/NACK bit and SR 1-bit.

Figure 16:
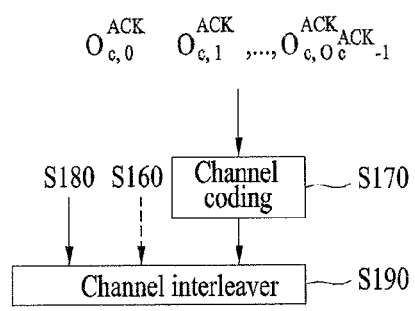
FIG. 16 illustrates a procedure for processing UL-SCH data and control information when HARQ-ACK is transmitted through a PUSCH in the case in which PUCCH format 3 mode is set.

FIG. 16 illustrates a procedure for processing UL-SCH data and control information when HARQ-ACK is transmitted through PUSCH in the case in which PUCCH format 3 mode is configured. FIG. 16 corresponds to a portion associated with A/N of the block diagram of FIG. 5.

In FIG. 16, HARQ-ACK payloads input to a channel coding block S170 are configured according to a method defined for PUCCH format 3. That is, the HARQ-ACK payloads are configured per cell and then are sequentially concatenated according to a cell index order. In detail, a HARQ-ACK feedback bit for the c-th serving cell (or DL CC) is given by $$o^{ACK}_{c,0} o^{ACK}_{c,1}, \ldots, o^{ACK}_{c,O^{ACK}_c-1} (c \geq 0).$$

Accordingly, when one serving cell is configured (c=0), $$o^{ACK}_{c=0,0} o^{ACK}_{c=0,1}, \ldots, o^{ACK}_{c=0,O^{ACK}_{c=0}-1}$$

are input to a channel coding block S170. As another example, when two serving cells are configured (c=0 and c=1), $$o^{ACK}_{c=0,0} o^{ACK}_{c=0,1}, \ldots, o^{ACK}_{c=0,O^{ACK}_{c=0}-1} + o^{ACK}_{c=1,0} o^{ACK}_{c=1,1}, \ldots, o^{ACK}_{c=1,O^{ACK}_{c=1}-1}$$

are input to the channel coding block S170. An output bit of the channel coding block S170 is input to a channel interleaver block S190. An output bit of data and control multiplexing block S180 and an output bit of an RI channel coding block S160 are also input to the channel interleaver block S190. RI is optionally present.

As described above, in the conventional LTE-A, a PUCCH format 3 transmission scheme may be applied in a CA situation having more than two CCs having the same TDD DL-UL configuration.

Hereinafter, an appropriate A/N state mapping method during A/N transmission through a PUCCH when a plurality of CCs having different TDD DL-UL configurations are aggregated and a PUCCH format 3 mode is set will be described. According to the present embodiment, a CA situation of two CCs is assumed. In addition, the number of A/N-DL SFs of each CC configured at PCC UL SF timing based on the Ref-Cfg is defined as Mc. Mcs may be differently configured TDD DL-UL Cfg and Ref-Cfg. The Ref-Cfg may be the same for all CCs or may be independently given to all CCs.

When the PUCCH format 3 mode is configured, A/N piggybacking on a PUSCH may be performed with reference to UL DAI (i.e., W) in a UL grant PDCCH for scheduling the corresponding PUSCH. W may be used to determine a range of (effective) A/N responses that are piggybacked on the PUSCH and preferably, may be used to signal a maximum value among the number of DL data scheduled per CC. In this case, in consideration of a 2-bit UL DAI field, modulo-4 operation may be applied to W that exceeds 4. Thus, in Embodiments 1 and 2, W may be replaced with $B^{DL}_c=W^{UL}_{DAI}+4\lceil(U-W^{UL}_{DAI})/4\rceil$. Here, Umax refers to a maximum value of the number of DL data per CC, which has been actually received by the UE.

In detail, when Ref-Cfg for A/N timing is configured as DL-UL Cfg #5 in at least one CC among a plurality of CCs included CA, $B^{DL}_c=W^{UL}_{DAI}+4\lceil(U-W^{UL}_{DAI})/4\rceil$ instead of W can be applied to all CCs. Thus, when there is no CC in which Ref-Cfg for A/N timing is configured as DL-UL Cfg #5 among a plurality of CCs included in CA, W can be applied to all CCs. Here, Umax may be a maximum value of the number of DL data per CC, which has been actually received by the UE. As another method, $B^{DL}_c=W^{UL}_{DAI}+4\lceil(U-W^{UL}_{DAI})/4\rceil$ instead of W can be applied to only a CC in which Ref-Cfg for A/N timing is configured as DL-UL Cfg #5. Here, Umax may be a maximum value of the number of DL data per CC, which has been actually received by the UE, with respect to only the corresponding CC (CC to which A/N timing of DL-UL Cfg #5 is applied). As another method, $B_c^{DL}=W_{DAI}^{UL}+4\lceil(U-W_{DAI}^{UL})/4\rceil$ is applied to only a CC to which A/N timing of DL-UL Cfg #5 is applied, where Umax refers to the number of DL data, which has been actually received in the corresponding CC by the UE.

Next, a method of configuring A/N payload, in detail, a method for determining A/N payload size (i.e., bit number) in PUCCH format 3 mode will be described with regard to an embodiment of the present invention. For convenience, the total number of CCs allocated to the UE is defined as N, and the number of CCs having Ntb=2, to which spatial bundling is not applied, among N CCs is defined as N2.

According to the present embodiment, when A/N is transmitted through a PUCCH, the total bit number (O) of A/N may be determined according to O=M×(N+N2) based on M that is fixed with regard to the corresponding UL subframe according to UL-DL Cfg. When A/N is piggybacked on a PUSCH, the total bit number (O) of A/N may be determined according to O=W×(N+N2) based on W(≤M). In other words, when A/N is piggybacked on a PUSCH, M (that has been used as a fixed value during A/N transmission to the PUCCH) may be replaced with W and an actual A/N transmission bit may be determined based on W. A detailed description may be summarized as follows.

Hereinafter, W is a value indicated by a UL DAI field in a UL grant PDCCH, and V is a value indicated by a DL DAI field in a DL grant PDCCH.

In the case of CC corresponding to N2
HARQ-ACK(2i−2) and (2i−1) are A/N responses to respective TBs of DL data corresponding to V=i
a 2 W of A/N bits in total are generated: HARQ-ACK(0), . . . , (2 W−1)
when a PCC and DL data w/o PDCCH is present, HARQ-ACK(2 W−1) may be an A/N response to the corresponding DL data (in this case, mapping may be performed according to HARQ-ACK(2 W−2)=D).
In the case of CC that does not correspond to N2
HARQ-ACK(i−1) is an A/N response to DL data corresponding to V=i
W of A/N bits in total are generated: HARQ-ACK(0), . . . , (W−1)
when a PCC and DL data w/o PDCCH is present, HARQ-ACK(W−1) may be an A/N response to the corresponding DL data
a final RM code input bit
the above generated W or 2 W A/N bits per CC are concatenated to configure W×(N+N2) of A/N bits in total: HARQ-ACK(0), . . . , (W×(N+N2)−1)
the A/N bits per CC may be concatenated in order from a low CC index to a high CC index (e.g., PCC first and SCC last)
HARQ-ACK(i) is determined as a final RM code input bit o(i) for A/N piggybacking on a PUSCH (through A→1 and N/D→0 mapping procedures). An order of A/N response→bit mapping may be changed according to implementation. For example, A/N response→bit mapping may be performed while A/N bit per CC is generated.

Hereinafter, proposed is an A/N state mapping method suitable for A/N piggybacking on a PUSCH when a PUCCH format 3 transmission scheme for A/N transmission to the PUCCH is applied to a CA situation of a plurality of CCs having different TDD DL-UL Cfgs will be described. In this example, a CA situation of N CCs is assumed and the number of A/N-DL SFs of each CC configured at specific PCC UL SF timing based on Ref-Cfg is defined as Mc. Mcs may be differently configured per CC according to application of different TDD DL-UL Cfg and Ref-Cfg. Hereinafter, as a proposed method, a method for allocating A/N bit per CC and determining a final RM code input bit corresponding to the AN bit according to a combination of Mc, N2, and W signaled via a UL grant PDCCH will be described in detail.

In the case of W≤Mc and CC corresponding to N2
HARQ-ACK(2i−2) and (2i−1) are A/N responses to TBs of DL data corresponding to V=i
a 2 W of A/N bits in total are generated: HARQ-ACK(0), . . . , (2 W−1)
when a PCC and DL data w/o PDCCH is present, HARQ-ACK(2 W−1) may be an A/N response to the corresponding DL data (in this case, mapping may be performed according to HARQ-ACK(2 W−2)=D)
In the case of W≤Mc and CC that does not correspond to N2
HARQ-ACK(i−1) is an A/N response to DL data corresponding to V=i
W of A/N bits in total are generated: HARQ-ACK(0), . . . , (W−1)
when a PCC and DL data w/o PDCCH is present, HARQ-ACK(W−1) may be an A/N response to the corresponding DL data
In the case of W>Mc and CC corresponding to N2
HARQ-ACK(2i−2) and (2i−1) are A/N responses to DL data corresponding to V=i
a 2Mc of A/N bits in total are generated: HARQ-ACK(0), . . . , (2Mc−1)
when a PCC and DL data w/o PDCCH is present, HARQ-ACK(2Mc−1) may be an A/N response to the corresponding DL data (in this case, mapping may be performed according to HARQ-ACK(2Mc−2)=D)
In the case of W>Mc and CC that does not correspond to N2
HARQ-ACK(i−1) is an A/N response to DL data corresponding to V=i
Mc of A/N bits in total are generated: HARQ-ACK(0), . . . , (Mc−1)
when a PCC and DL data w/o PDCCH is present, HARQ-ACK(Mc−1) may be an A/N response to the corresponding DL data
final RM code input bit
W, 2 W, Mc, or 2Mc A/N bits generated in the above per CC are concatenated (in this case, Mc may differ per CC): HARQ-ACK(0), . . .
the A/N bits per CC may be concatenated in order from a low CC index to a high CC index (e.g., PCC first and SCC last)
HARQ-ACK(i) is determined as a final RM code input bit o(i) for A/N piggybacking on a PUSCH (via A→1 and N/D→0 mapping procedures). An order of A/N response→bit mapping may be changed according to implementation. For example, A/N response→bit mapping may be performed during generation of A/N bit per CC.

Hereinafter, when Lc=min (Mc, W) is defined, the proposed method is summarized as follows. Here, Mc refers M for each CC and may be the same or may differ per CC. That is, Mc is independently given per CC.

In the case of CC corresponding to N2
HARQ-ACK(2i−2), (2i−1) are A/N responses to TBs of DL data corresponding to V=i
a 2Lc of A/N bits in total are generated: HARQ-ACK(0), . . . , (2Lc−1)
when a PCC and DL data w/o PDCCH is present, HARQ-ACK(2Lc−1) may be an A/N response to the corresponding DL data (in this case, mapping may be performed according to HARQ-ACK(2Lc−2)=D)
In the case of CC that does not correspond to N2
HARQ-ACK(i−1) is an A/N response to DL data corresponding to V=i
Lc of A/N bits in total are generated: HARQ-ACK(0), . . . , (Lc−1)
when a PCC and DL data w/o PDCCH is present, HARQ-ACK(Lc−1) may be an A/N response to the corresponding DL data
final RM code input bit Lc or 2Lc A/N bits determined in the above per CC are concatenated (in this case, Lc may differ per CC): HARQ-ACK(0), . . .

the A/N bits per CC may be concatenated in order from a low CC index to a high CC index (e.g., PCC first and SCC last)

HARQ-ACK(i) is determined as a final RM code input bit o(i) for A/N piggybacking on a PUSCH (via A→1 and N/D→0 mapping procedures). An order of A/N response→bit mapping may be changed according to implementation. For example, A/N response→bit mapping may be performed during generation of A/N bit per CC.

Figure 17:
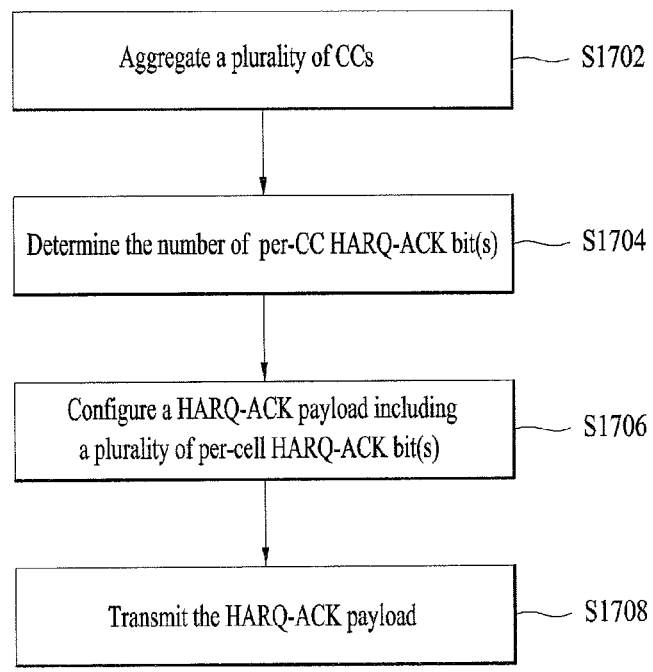
FIG. 17 illustrates exemplary TDD CA A/N transmission according to another embodiment of the present invention.

FIG. 17 illustrates exemplary A/N transmission according to an embodiment of the present invention. Although the A/N transmission will be described with reference to FIG. 17 as to a UE for convenience, it is obvious that a corresponding operation can be performed by a base station.

Referring to FIG. 17, the UE aggregates a plurality of CCs (S1702). Here, a plurality of CCs may have different UL-DL configurations. Then, upon receiving DL data (e.g., a PDSCH and an SPS release PDCCH), the UE performs a procedure for transmitting A/N feedback for the DL data. In detail, the UE may determine the number of per-CC HARQ-ACK bits (S1704). Then, the UE may configure HARQ-ACK payload including a plurality of per-cell HARQ-ACK bit(s) (S1706). Then, the UE may transmit the HARQ-ACK payload to the base station through a PUSCH (S1708). In this example, when a first condition is satisfied, the number of per-CC HARQ-ACK bits may be determined using min (W, Mc), and when a second condition is satisfied, the number of per-CC HARQ-ACK bits may be determined using $\min(B_c^{DL}=W_{DAI}^{UL}+4\lceil(U-W_{DAI}^{UL})/4\rceil, M_c)$. The first condition includes a case in which there is no CC in which Ref-Cfg for A/N timing is configured as DL-UL Cfg #5 among a plurality of CCs configured for CA. On the other hand, the second condition includes a case in which Ref-Cfg for A/N timing is configured as DL-UL Cfg #5 for at least one CC among a plurality of CCs.

In all the above-described methods, when Mc=0 with respect to a specific CC, an A/N bit to the corresponding CC and an RM code input bit corresponding thereto may not be generated. As a result, A/N feedback to the corresponding CC may be excluded from, that is, may not be included in an A/N payload configuration to be transmitted on a PUSCH.

A special SF (S SF) (e.g., which corresponds to S SF configuration #0 in Table 2) having less than N (e.g., N=3) OFDM symbols may be allocated to a DwPTS period. In this case, when the corresponding S SF is configured in a PCC (i.e., a PCell), a PDCCH (which requires only 1-bit A/N feedback) requesting SPS release may be transmitted through the corresponding S SF. On the other hand, when the corresponding S SF is configured in an SCC (i.e., an SCell), any PDCCH/DL that requires A/N feedback may not be transmitted through the corresponding S SF. Thus, according to the proposed method, if the corresponding S SF (referred to as a shortest S SF for convenience) having a small DwPTS period is configured in a PCell as in the example, A/N corresponding to the corresponding shortest S SF may always be allocated to 1-bit irrespective of Ntb configured for the corresponding PCell or the corresponding shortest S SF may be excluded from an A/N-DL SF for determination of M. In this case, the UE may consider that a PDCCH requesting SPS release is not transmitted through the corresponding S SF (Thus, a PDCCH monitoring procedure (e.g., blind decoding) may be omitted in the PCell S SF). When the shortest S SF is configured in the SCell, the corresponding S SF may be excluded from the A/N-DL SF for determination of M. As another example, in the case of the PCell, Ntb-bit (e.g., M=1) based on an Ntb value configured in the corresponding PCell or 1-bit (e.g., M>1) using spatial bundling may also be allocated to A/N corresponding to the shortest S SF, and in the case of the SCell, the shortest S SF may be excluded from the A/N-DL SF for determination of M. In addition, when W corresponding to the A/N PUSCH is not present (e.g., a SPS-based PUSCH) or A/N is transmitted through a PUCCH, the aforementioned M-based A/N payload configuration (determination of HARQ-ACK(i) and generation of RM code input bit corresponding thereto) may be used.

Additionally, when the PCell and the SCell have the same TDD DL-UL Cfg, if the shortest S SF is configured, the proposed method may be applied using the above schemes (i.e., A/N corresponding to the corresponding S SF is always allocated to 1-bit or the corresponding S SF is excluded from the A/N-DL SF (during determination of M). In this case, in the method for excluding the shortest S SF (during determination of M) from the A/N-DL S, assuming that M when the shortest S SF is not excluded from the A/N-DL is M', M when the shortest S SF is excluded from the A/N-DL is M'-1. In this case, in the case of a cell in which the shortest S SF is configured, with regard to a period including the corresponding S SF (A/N-DL SF included in the period), channel selection mapping (i.e., determination of A/N state HARQ-ACK(i) and generation of RM code input bit corresponding thereto) based on min(M, W)=min(M'-1, W), i.e., M'-1 in the case of W=M' (or W≥M') only. In addition, when W corresponding to the A/N PUSCH is not present, channel selection mapping based on M'-1 may be applied. In other cases (i.e., W<M'), channel selection mapping based on W may be applied. Preferably, this method can be applied to the case in which M' is 1 or 2. In addition, M'-1=0, A/N corresponding thereto may not be configured (and may be allocated to 0-bit).

Figure 18:
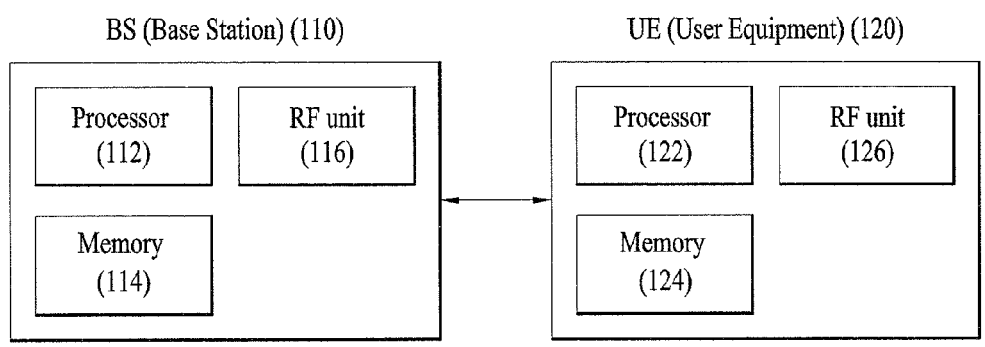
FIG. 18 is a block diagram of a BS and a UE that are application to embodiments of the present invention.

FIG. 18 is a block diagram of a BS 110 and a UE 120 that are application to embodiments of the present invention. In the case of a system including a relay, the BS or the UE may be replaced with the relay.

Referring to FIG. 18, a wireless communication system includes the BS 110 and the UE 120. The BS 110 includes a processor 112, a memory 114, and a radio frequency (RF) unit 116. The processor 112 may be configured to perform the proposed procedures and/or methods according to the present invention. The memory 114 is connected to the processor 112 and stores various information related to operations of the processor 112. The RF unit 116 is connected to the processor 112 and transmits and/or receives radio signals. The UE 120 includes a processor 122, a memory 124, and an RF unit 126. The processor 122 may be configured to perform the proposed procedures and/or methods according to the present invention. The memory 124 is connected to the processor 122 and stores various information related to operations of the processor 122. The RF unit 126 is connected to the processor 122 and transmits and/or receives radio signals. The BS 110 and/or the UE 120 may include a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc. The term terminal may be replaced with a UE, a mobile station (MS), a mobile subscriber station (MSS), etc.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention is applicable to a wireless communication apparatus such as a UE, an RN, an eNB, etc.

What is claimed is:

1. A method for transmitting uplink control information by a user equipment in a wireless communication system supporting carrier aggregation and operating in time division duplex (TDD), the user equipment being configured with a first component carrier (CC) and a second CC having different uplink-downlink configurations and the user equipment being configured to transmit a hybrid automatic repeat request-acknowledgement (HARQ-ACK) response based on channel selection, the method comprising:
   determining HARQ-ACK bits for the first CC and the second CC; and
   transmitting the determined HARQ-ACK bits through a physical uplink shared channel (PUSCH) in an uplink subframe,
   wherein one or more HARQ-ACK bits for the first CC, and one or more HARQ-ACK bits for the second CC are determined, respectively, based on min (M1, W) and min (M2, W), when a value W indicated by a downlink assignment index in an uplink grant corresponding to the PUSCH is 1 or 2 and
   wherein min (A, B) represents a smallest number from A and B, M1 represents a number of downlink subframes corresponding to the uplink subframe on the first CC, and M2 represents a number of downlink subframes corresponding to the uplink subframe on the second CC.

2. The method according to claim 1, further comprising:
   receiving downlink signals in M1 downlink subframes corresponding to the uplink subframe on the first CC and in M2 downlink subframes corresponding to the uplink subframe on the second CC,
   wherein when the value W is 1 or 2, the determined HARQ-ACK bits correspond to respective HARQ-ACK responses for the downlink signals received on the first CC and the second CC.

3. The method according to claim 1, wherein when the value W is 3 or 4, HARQ-ACK bits for the first CC are determined based on W and HARQ-ACK bits for the second CC are determined based on W.

4. The method according to claim 3, further comprising:
   receiving downlink signals in M1 downlink subframes corresponding to the uplink subframe on the first CC and in M2 downlink subframes corresponding to the uplink subframe on the second CC,
   wherein when the value W is 3 or 4, the determined HARQ-ACK bits comprise a 4-bit value representing 2 W HARQ-ACK responses for the downlink signals received on the first CC and the second CC.

5. The method according to claim 1, wherein the first CC is a primary CC (PCC) and the second CC is a secondary CC (SCC).

6. The method according to claim 1, wherein each of the first CC and the second CC has one of uplink-downlink configurations 0 to 6,
   wherein a radio frame configuration of a CC is determined according to an uplink-downlink configuration of the CC based on the following table:

| uplink-downlink configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | and
   wherein D denotes a subframe for downlink, S denotes a subframe comprising a downlink period, a guard period, and an uplink period, and U denotes a subframe for uplink.

7. The method according to claim 1, wherein when the uplink subframe is a subframe n and each of the downlink subframes is a subframe n-k, k is given according to an uplink-downlink configuration based on the following table:

| uplink-downlink configuration | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

-continued

| uplink-downlink configuration | \multicolumn{10}{c}{subframe n} | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

8. A user equipment configured to transmit uplink control information in a wireless communication system supporting carrier aggregation and operating in time division duplex (TDD), the user equipment being configured with a first component carrier (CC) and a second CC having different uplink-downlink configurations and the user equipment being configured to transmit a hybrid automatic repeat request-acknowledgement (HARQ-ACK) response based on channel selection, the user equipment comprising:
a radio frequency (RF) unit;
a memory; and
a processor coupled to the RF unit and the memory storing information causing the processor to perform:
determining HARQ-ACK bits for the first CC and the second CC, and
transmitting the determined HARQ-ACK bits through a physical uplink shared channel (PUSCH) in an uplink subframe through the RF unit,
wherein one or more HARQ-ACK bits for the first CC, and one or more HARQ-ACK bits for the second CC are determined by the processor, respectively, based on min (M1, W) and min (M2, W), when a value W indicated by a downlink assignment index in an uplink grant corresponding to the PUSCH is 1 or 2 and
wherein min (A, B) represents a smallest number from A and B, M1 represents a number of downlink subframes corresponding to the uplink subframe on the first CC, and M2 represents a number of downlink subframes corresponding to the uplink subframe on the second CC.

9. The user equipment according to claim 8, wherein the processor is further configured to receive downlink signals in M1 downlink subframes corresponding to the uplink subframe on the first CC and in M2 downlink subframes corresponding to the uplink subframe on the second CC through the RF unit, and
wherein when the value W is 1 or 2, the determined HARQ-ACK bits corresponds to respective HARQ-ACK responses for the downlink signals received on the first CC and the second CC.

10. The user equipment according to claim 8, wherein when the value W is 3 or 4, HARQ-ACK bits for the first CC are determined based on W and HARQ-ACK bits for the second CC are determined based on W.

11. The user equipment according to claim 10, wherein the processor is further configured to receive downlink signals in M1 downlink subframes corresponding to the uplink subframe on the first CC and in M2 downlink subframes corresponding to the uplink subframe on the second CC through the RF unit, and
wherein when the value W is 3 or 4, the determined HARQ-ACK bits comprise a 4-bit value representing 2 W HARQ-ACK responses for the downlink signals received on the first CC and the second CC.

12. The user equipment according to claim 8, wherein the first CC is a primary CC (PCC) and the second CC is a secondary CC (SCC).

13. The user equipment according to claim 8, wherein each of the first CC and the second CC has one of uplink-downlink configurations 0 to 6,
wherein a radio frame configuration of a CC is determined according to an uplink-downlink configuration of the CC based on the following table:

| uplink-downlink configuration | \multicolumn{10}{c}{subframe number} | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D, | and
wherein D denotes a subframe for downlink, S denotes a subframe comprising a downlink period, a guard period, and an uplink period, and U denotes a subframe for uplink.

14. The user equipment according to claim 8, wherein when the uplink subframe is a subframe n and each of the downlink subframes is a subframe n-k, k is given according to an uplink-downlink configuration based on the following table:

| uplink-downlink configuration | \multicolumn{10}{c}{subframe n} | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

-continued

| uplink-downlink configuration | subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

\* \* \* \* \*